United States Patent
Li et al.

(10) Patent No.: US 12,335,955 B2
(45) Date of Patent: Jun. 17, 2025

(54) UPLINK CONTROL INFORMATION TRANSMISSION METHOD AND APPARATUS

(71) Applicant: Huawei Technologies Co., Ltd., Shenzhen (CN)

(72) Inventors: Ruijie Li, Beijing (CN); Lei Guan, Beijing (CN); Shengyu Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 17/866,192

(22) Filed: Jul. 15, 2022

(65) Prior Publication Data

US 2022/0361164 A1    Nov. 10, 2022

Related U.S. Application Data

(63) Continuation of application No. PCT/CN2020/108021, filed on Aug. 7, 2020.

(30) Foreign Application Priority Data

Jan. 17, 2020   (WO) ............... PCT/CN2020/072861

(51) Int. Cl.
  *H04W 72/21*    (2023.01)
  *H04L 1/08*    (2006.01)
  (Continued)

(52) U.S. Cl.
  CPC ............. *H04W 72/21* (2023.01); *H04L 1/08* (2013.01); *H04W 72/0446* (2013.01); *H04W 72/23* (2023.01)

(58) Field of Classification Search
  CPC . H04W 72/21; H04W 72/0446; H04W 72/23; H04L 1/08; H04L 5/0053; H04L 5/0007
  See application file for complete search history.

(56) References Cited

U.S. PATENT DOCUMENTS

2016/0262182 A1* 9/2016 Yang ................. H04W 4/70
2019/0173611 A1  6/2019 Liu et al.
(Continued)

FOREIGN PATENT DOCUMENTS

CN    105409138 A    3/2016
CN    105594139 A    5/2016
(Continued)

OTHER PUBLICATIONS

"3rd Generation Partnership Project; Technical Specification Group Radio Access Network; NR; Radio Resource Control (RRC) protocol specification (Release 15)," 3GPP TS 38.331 V15.8.0, pp. 1-532, 3rd Generation Partnership Project, Valbonne, France (Dec. 2019).

(Continued)

*Primary Examiner* — Christine Ng
(74) *Attorney, Agent, or Firm* — Leydig, Voit & Mayer, Ltd.

(57) ABSTRACT

An uplink control information transmission method are described. The method includes: receiving indication information, where the indication information is used to indicate a first physical uplink control channel (PUCCH) resource and a quantity N of repeated transmissions. The method further includes determining the first PUCCH resource and the quantity N of repeated transmissions in at least one PUCCH resource set based on the indication information; and repeatedly sending uplink control information uplink control information (UCI) for M times by using the first PUCCH resource and the quantity N of repeated transmissions.

20 Claims, 25 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2019/0223205 A1 | 7/2019 | Papasakellariou | |
| 2020/0045722 A1* | 2/2020 | Bae | H04W 72/21 |
| 2020/0145169 A1* | 5/2020 | Zhou | H04W 80/02 |
| 2020/0214006 A1 | 7/2020 | Choi et al. | |
| 2021/0227537 A1* | 7/2021 | Yamamoto | H04L 1/0016 |
| 2022/0007356 A1* | 1/2022 | Lee | H04L 27/26 |
| 2022/0086032 A1* | 3/2022 | Park | H04W 72/0446 |
| 2022/0360392 A1* | 11/2022 | Matsumura | H04W 24/10 |

FOREIGN PATENT DOCUMENTS

| | | |
|---|---|---|
| CN | 107113137 A | 8/2017 |
| CN | 109728882 A | 5/2019 |
| CN | 110603767 A | 12/2019 |
| WO | 2019050381 A1 | 3/2019 |
| WO | 2019135597 A1 | 7/2019 |

OTHER PUBLICATIONS

"3rd Generation Partnership Project; Technical Specification Group Radio Access Network; NR; Multiplexing and channel coding (Release 16)," 3GPP TS 38.212 V16.0.0, pp. 1-145, 3rd Generation Partnership Project, Valbonne, France (Dec. 2019).

"Remaining Issues on PUCCH," 3GPP TSG RAN WG1 #94, Gothenburg, Korea, R1-1808754, Total 7 pages, 3rd Generation Partnership Project, Valbonne, France (Aug. 20-24, 2018).

"Discussion on PUCCH transmission for Rel-13 MTC," 3GPP TSG-RAN WG1 Meeting #80BIS, Belgrade, RS, R1-152115, Total 4 pages, 3rd Generation Partnership Project, Valbonne, France (Apr. 20-24, 2015).

"5G; NR; Physical layer procedures for control (3GPP TS 38.213 version 15.8.0 Release 15)," ETSI TS 138 213 V15.8.0, Total 112 pages, European Telecommunication Standards Institute, Sophia Antipolis Cedex, France (Jan. 2020).

"3rd Generation Partnership Project; Technical Specification Group Radio Access Network; NR; Physical layer procedures for control (Release 15)," 3GPP TS 38.213 V15.8.0, pp. 1-109, 3rd Generation Partnership Project, Valbonne, France (Dec. 2019).

* cited by examiner

UPLINK CONTROL INFORMATION TRANSMISSION METHOD AND APPARATUS

CROSS-REFERENCE TO RELATED APPLICATIONS

This application is a continuation of International Application No. PCT/CN2020/108021, filed on Aug. 7, 2020, which claims priority to International Application No. PCT/CN2020/072861, filed on Jan. 17, 2020. The disclosures of the aforementioned applications are hereby incorporated by reference in their entireties.

TECHNICAL FIELD

This application relates to the field of communication technologies, and in particular, to an uplink control information transmission method and an apparatus.

BACKGROUND

In 5th generation (5G) mobile communication, a terminal device may transmit uplink control information (UCI) to a network device side through a physical uplink control channel (PUCCH) channel. A network device usually configures one or more (e.g., two to four) PUCCH resource sets for the terminal device. Before sending the UCI, the terminal device first determines one PUCCH resource set in the one or more PUCCH resource sets based on a quantity of bits of the to-be-transmitted UCI, and then determines one PUCCH resource in the PUCCH resource set by using a PUCCH indicator field (PUCCH resource indicator) in DCI sent by the network device. To ensure transmission reliability of hybrid automatic repeat request (HARQ) acknowledgement information in the UCI, the terminal device further receives configuration information from higher layer signaling, where the configuration information indicates a quantity N of repeated transmissions. As a result, the terminal device repeatedly transmits the PUCCH in N uplink slots.

Currently, a problem in an uplink control information transmission method is as follows: A network device configures a quantity of repeated transmissions of a terminal device by using configuration information. As a result, the terminal device always repeatedly transmits a PUCCH in N uplink slots. It can be learned that a current manner of configuring a quantity of repeated transmissions of a PUCCH is not flexible enough, and resource utilization is reduced.

SUMMARY

According to a first aspect, an embodiment of this application provides an uplink control information transmission method and an apparatus. The method may be performed by a terminal device, or may be performed by a chip used in the terminal device. An example in which an execution body is the terminal device is used for description below. The method includes: receiving indication information, where the indication information is used to indicate a first PUCCH resource and a quantity N of repeated transmissions; determining the first PUCCH resource and the quantity N of repeated transmissions in at least one PUCCH resource set based on the indication information; and finally repeatedly transmitting uplink control information UCI for M times by using the first PUCCH resource and the quantity N of repeated transmissions, where M is a positive integer.

In this embodiment of this application, because a network device preconfigures a PUCCH resource and a quantity of repeated transmissions, the terminal device may transmit UCI based on an indication of the network device and the quantity of repeated transmissions corresponding to the PUCCH resource, so that a quantity of repeated transmissions of a PUCCH can be flexibly configured, thereby improving resource utilization.

In a possible implementation, when the at least one PUCCH resource set includes at least two PUCCH resource sets, the terminal device may first determine a target PUCCH resource set in the at least two PUCCH resource sets based on a quantity of bits of the UCI; and then determine the first PUCCH resource and the quantity N of repeated transmissions in the target PUCCH resource set based on the indication information.

In this embodiment of this application, the first PUCCH resource and the quantity N of repeated transmissions are indicated by using one piece of indication information, so that signaling overheads can be effectively reduced.

In a possible implementation, the quantity N of repeated transmissions is configured by the network device for the first PUCCH resource in the at least one PUCCH resource set; or the quantity N of repeated transmissions is configured by the network device for a PUCCH resource set corresponding to the first PUCCH resource. In other words, the network device preconfigures the PUCCH resource and the quantity of repeated transmissions corresponding to the PUCCH resource, to flexibly configure the quantity of repeated transmissions of the PUCCH resource.

In a possible implementation, the indication information includes first indication information and second indication information, the first indication information is used to indicate the first PUCCH resource, and the second indication information is used to indicate the quantity N of repeated transmissions. The terminal device may determine a target PUCCH resource set in the at least two PUCCH resource sets based on the quantity N of repeated transmissions; or the terminal device determines a target PUCCH resource set in the at least two PUCCH resource sets based on the quantity N of repeated transmissions and a quantity of bits of the UCI. Then, the terminal device determines the first PUCCH resource in the target PUCCH resource set based on the first indication information; and determines, in the target PUCCH resource set based on the second indication information, the quantity N of repeated transmissions corresponding to the first PUCCH resource. In this embodiment of this application, the terminal device determines the target PUCCH resource set based on the quantity N of repeated transmissions and the quantity of bits of the UCI. The terminal device may be associated with a plurality of PUCCH resource sets with a same quantity of bits of the UCI, to more flexibly configure the resource sets.

In a possible implementation, the at least one PUCCH resource set includes a quantity of repeated transmissions corresponding to a PUCCH resource in the at least one PUCCH resource set; the at least one PUCCH resource set includes a quantity of repeated transmissions corresponding to the at least one PUCCH resource set; or the at least one PUCCH resource set includes a maximum allowed quantity of repeated transmissions corresponding to the at least one PUCCH resource set and a quantity of repeated transmissions corresponding to a PUCCH resource in the at least one PUCCH resource set. In this embodiment of this application, the quantity of repetitions may be associated with the PUCCH resource or the PUCCH resource set in a plurality of manners. This improves configuration flexibility.

In a possible implementation, the indication information is carried in downlink control information DCI. In this embodiment of this application, the PUCCH resource and the quantity of repeated transmissions may be dynamically indicated by using the downlink control information.

In a possible implementation, PUCCH resources used for S times of repeated transmitting of the UCI in the M times of repeated transmitting of the UCI occupy consecutive symbols in one slot, and S is greater than or equal to 2 and is less than or equal to M.

In this way, a delay between N PUCCH resources determined in this embodiment of this application is short, so that a UCI transmission delay can be reduced to some extent, and a delay requirement of a service having a high delay requirement can be met.

In a possible implementation, PUCCH resources used for S times of repeated transmitting of the UCI in the M times of repeated transmitting of the UCI occupy one slot, a quantity of interval symbols of the PUCCH resources used for the S times of repeated transmitting of the UCI in a same slot is predefined, and S is greater than or equal to 2 and is less than or equal to M. In this embodiment of this application, the quantity of interval symbols of the PUCCH resources may be configured. This configuration manner is more flexible, and different requirements are met.

In a possible implementation, a PUCCH resource used for each of the M times of repeated transmitting of the UCI occupies a same number of symbols in time domain.

In a possible implementation, time domain resources used for the M times of repeated transmitting of the UCI are resources in M sub-slots. For example, the M sub-slots are at least two consecutive sub-slots.

In this way, because N PUCCH resources determined in this embodiment of this application are sub-slots, a delay between the PUCCH resources is short. Therefore, a UCI transmission delay can be reduced to some extent, and a delay requirement of a service having a high delay requirement can be met.

In a possible implementation, each of PUCCH resources used for the M times of repeated transmitting of the UCI has a same start position and a same symbol length in different sub-slots.

In a possible implementation, a format of the first PUCCH resource is a format 0 or a format 2.

In a possible implementation, M is equal to N.

In a possible implementation, the repeatedly transmitting uplink control information UCI for M times by using the first PUCCH resource and the quantity N of repeated transmissions includes: determining M by using N PUCCH resources, where the first PUCCH resource is one of the N PUCCH resources.

In a possible implementation, the N PUCCH resources are consecutive in time domain.

In a possible implementation, an interval between the N PUCCH resources in time domain is predefined.

In a possible implementation, the determining M by using N PUCCH resources includes: There are H PUCCH resources in the N PUCCH resources crossing a slot boundary, where M=N+H, and H is less than N.

In a possible implementation, the determining M by using N PUCCH resources includes: If there are R second PUCCH resources in the N PUCCH resources, M=N—R, where R is less than N, and the second PUCCH resource is a downlink symbol, a sending conversion symbol, or a predefined symbol.

Optionally, the crossing a slot boundary means that a time domain of one PUCCH resource separately belongs to at least two slots.

Optionally, the PUCCH resource set in this specification actually refers to an information element of the PUCCH resource set.

According to a second aspect, an embodiment of this application provides an uplink control information transmission method. The method may be performed by a network device or a chip used in the network device. An example in which an execution body is the network device is used for description below. The method includes: determining a first PUCCH resource and a quantity N of repeated transmissions in at least one PUCCH resource set; then sending indication information, where the indication information is used to indicate the first PUCCH resource and the quantity N of repeated transmissions; and finally repeatedly receiving uplink control information UCI for M times by using the first PUCCH resource and the quantity N of repeated transmissions, where M and N are positive integers.

Because the communication method described in the second aspect corresponds to the communication method described in the first aspect, for related beneficial effects of the communication method described in the second aspect, refer to the first aspect. Details are not described herein again.

In a possible implementation, before that the network device determines a first PUCCH resource and a quantity N of repeated transmissions in at least one PUCCH resource set, the method further includes: sending configuration information, where the configuration information includes a quantity of repeated transmissions corresponding to at least one PUCCH resource in the at least one PUCCH resource set; the configuration information includes a quantity of repeated transmissions corresponding to the at least one PUCCH resource set; or the configuration information includes a maximum allowed quantity of repeated transmissions corresponding to the at least one PUCCH resource set and a quantity of repeated transmissions corresponding to at least one PUCCH resource in the at least one PUCCH resource set. In this embodiment of this application, the quantity of repetitions may be associated with the PUCCH resource or the PUCCH resource set in a plurality of manners. This improves configuration flexibility.

In a possible implementation, the indication information includes first indication information and second indication information, the first indication information is used to indicate the first PUCCH resource, and the second indication information is used to indicate the quantity N of repeated transmissions. In this embodiment of this application, the first PUCCH resource and the quantity of repeated transmissions are respectively indicated by using two pieces of indication information. This configuration manner is more flexible.

In a possible implementation, the at least one PUCCH resource set includes a quantity of repeated transmissions corresponding to a PUCCH resource in the at least one PUCCH resource set;

the at least one PUCCH resource set includes the quantity of repeated transmissions corresponding to the at least one PUCCH resource set; or the at least one PUCCH resource set includes the maximum allowed quantity of repeated transmissions corresponding to the at least one PUCCH resource set and a quantity of repeated transmissions corresponding to a PUCCH resource in the at least one PUCCH resource set.

In a possible implementation, the indication information is carried in downlink control information DCI.

In a possible implementation, PUCCH resources used for S times of repeated transmitting of the UCI in the M times of repeated transmitting of the UCI occupy consecutive symbols in one slot, and S is greater than or equal to 2 and is less than or equal to M.

In a possible implementation, when PUCCH resources used for S times of repeated transmitting of the UCI in the M times of repeated transmitting of the UCI occupy one slot, a quantity of interval symbols of the PUCCH resources used for the S times of repeated transmitting of the UCI in a same slot is predefined, and S is greater than or equal to 2 and is less than or equal to M.

In a possible implementation, a PUCCH resource used for each of the M times of repeated transmitting of the UCI occupies a same number of symbols in time domain.

In a possible implementation, time domain resources used for the M times of repeated transmitting of the UCI are resources in M sub-slots, or the M sub-slots are at least two consecutive sub-slots.

In a possible implementation, each of PUCCH resources used for the M times of repeated sending of the UCI has a same start position and a same symbol length in different sub-slots.

In a possible implementation, a format of the first PUCCH resource is a format 0 or a format 2.

In a possible implementation, M is equal to N.

In a possible implementation, the repeatedly transmitting uplink control information UCI for M times by using the first PUCCH resource and the quantity N of repeated transmissions includes: determining M by using N PUCCH resources, where the first PUCCH resource is one of the N PUCCH resources.

In a possible implementation, the N PUCCH resources are consecutive in time domain.

In a possible implementation, an interval between the N PUCCH resources in time domain is predefined.

In a possible implementation, the determining M by using N PUCCH resources includes: There are H PUCCH resources in the N PUCCH resources crossing a slot boundary, where M=N+H, and H is less than N.

In a possible implementation, the determining M by using N PUCCH resources includes: If there are R second PUCCH resources in the N PUCCH resources, M=N—R, where R is less than N, and the second PUCCH resource is a downlink symbol, a sending conversion symbol, or a predefined symbol.

In a possible implementation, time domain positions of the N PUCCH resources may be calculated in the following manner, where n=0, 1, 2, . . . , N−1.

A start slot for starting to transmit a PUCCH may be calculated according to the following formula:

$$K_s + \left\lfloor \frac{S+n\cdot L}{N_{symb}^{slot}} \right\rfloor,$$

where $K_s$ is an indicated slot in which the first PUCCH is located, S is a time domain start symbol of the first PUCCH resource, L is a symbol length occupied by the first PUCCH resource, and $N_{symb}^{slot}$ is a number of symbols in one slot.

A start transmission symbol of the PUCCH relative to a start point of the slot may be calculated according to the following formula:

mod (S+n·L, $N_{symb}^{slot}$), where mod (T, y) represents a modulo operation. For example, mod (10, 3) is equal to 1, and mod (10, 2) is equal to 0.

A position of the last slot in which PUCCH transmission is performed may be calculated according to the following formula:

$$K_s + \left\lfloor \frac{S+(n+1)\cdot L-1}{N_{symb}^{slot}} \right\rfloor,$$

where $K_s$ is an indicated slot in which the first PUCCH is located, S is a time domain start symbol of the first PUCCH resource, L is a symbol length occupied by the first PUCCH resource, and $N_{symb}^{slot}$ is a number of symbols in one slot.

The last symbol of the PUCCH relative to the start point of the slot is mod(S+(n+1)·L−1, $N_{symb}^{slot}$).

According to a third aspect, an embodiment of this application provides an uplink control information transmission method. The method may be performed by a terminal device, and the method includes: receiving first indication information and second indication information, where because the first indication information is used to indicate a first PUCCH resource, the first PUCCH resource is determined in at least one PUCCH resource set based on the first indication information; and because the second indication information is used to indicate a quantity N of repeated transmissions, UCI is repeatedly transmit for M times by using the first PUCCH resource and the quantity N of repeated transmissions, where M and N are positive integers.

In this embodiment of this application, the terminal device may reuse existing signaling indicating a quantity of repeated transmissions, to indicate a repeated transmission in a single time unit, so that signaling overheads can be reduced, a UCI transmission delay can also be reduced to some extent, and a delay requirement of a service having a high delay requirement can be met.

In a possible implementation, when the at least one PUCCH resource set includes at least two PUCCH resource sets, the method further includes: The terminal device determines a target PUCCH resource set in the at least two PUCCH resource sets based on a quantity of bits of the UCI; and determines the first PUCCH resource in the target PUCCH resource set based on the first indication information.

In a possible implementation, the first indication information is carried in downlink control information DCI, and the second indication information is carried in higher layer configuration signaling.

In a possible implementation, PUCCH resources used for S times of repeated transmitting of the UCI in the M times of repeated transmitting of the UCI occupy consecutive symbols in one slot, and S is greater than or equal to 2 and is less than or equal to M.

In a possible implementation, when PUCCH resources used for S times of repeated sending of the UCI in the M times of repeated transmitting of the UCI occupy one slot, a quantity of interval symbols of the PUCCH resources used for the S times of sending of the UCI in a same slot is predefined, and S is greater than or equal to 2 and is less than or equal to M.

In a possible implementation, a PUCCH resource used for each of the M times of repeated transmitting of the UCI occupies a same number of symbols in time domain.

In a possible implementation, time domain resources used for the M times of repeated transmitting of the UCI are resources in M sub-slots.

In a possible implementation, the M sub-slots are at least two consecutive sub-slots.

In a possible implementation, each of PUCCH resources used for the M times of repeated transmitting of the UCI has a same start position and a same symbol length in different sub-slots.

In a possible implementation, a format of the first PUCCH resource is a format 0 or a format 2.

According to a fifth aspect, an embodiment of this application provides an uplink control information transmission method. The method may be performed by a network device, and the method includes: determining a first PUCCH resource in at least one PUCCH resource set and a quantity N of repeated transmissions; sending first indication information and second indication information, where the first indication information is used to indicate the first PUCCH resource, and the second indication information is used to indicate the quantity N of repeated transmissions; and repeatedly receiving UCI for M times by using the first PUCCH resource and the quantity N of repeated transmissions, where M and N are positive integers.

Because the communication method described in the fourth aspect corresponds to the communication method described in the third aspect, for related beneficial effects of the communication method described in the fourth aspect, refer to the third aspect. Details are not described herein again.

In a possible implementation, the indication information is carried in downlink control information DCI.

In a possible implementation, PUCCH resources used for S times of repeated receiving of the UCI in the M times of repeated receiving of the UCI occupy consecutive symbols in one slot, and S is greater than or equal to 2 and is less than or equal to M.

In a possible implementation, PUCCH resources used for S times of repeated receiving of the UCI in the M times of repeated receiving of the UCI occupy one slot, a quantity of interval symbols of the PUCCH resources used for the S times of repeated receiving of the UCI in a same slot is predefined, and S is greater than or equal to 2 and is less than or equal to M.

In a possible implementation, a PUCCH resource used for each of the M times of repeated transmitting of the UCI occupies a same number of symbols in time domain.

In a possible implementation, time domain resources used for the M times of repeated transmitting of the UCI are resources in M sub-slots. The M sub-slots are at least two consecutive sub-slots.

In a possible implementation, each of PUCCH resources used for the M times of repeated transmitting of the UCI has a same start position and a same symbol length in different sub-slots.

In a possible implementation, a format of the first PUCCH resource is a format 0 or a format 2.

According to a fifth aspect, this application provides a communication apparatus. The communication apparatus may be a terminal device or a chip disposed in a terminal device. The communication apparatus has a function of implementing the first aspect. For example, the communication apparatus includes a corresponding module, unit, or means for performing the steps in the first aspect. The function, the unit, or the means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive first information from a network device. The processing unit may be configured to perform some internal operations of the communication apparatus. Functions performed by the processing unit and the communication unit may correspond to the steps in the first aspect.

In a possible design, the communication apparatus includes a processor, and may further include a transceiver. The transceiver is configured to receive and send a signal, and the processor executes program instructions, to complete the method according to any one of the possible designs or implementations in the first aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the function in the first aspect. The processor may execute the computer program or the instructions stored in the memory. When the computer program or the instructions is/are executed, the communication apparatus is enabled to implement the method according to any one of the possible designs or implementations in the first aspect.

In a possible design, the communication apparatus includes a processor and a memory. The memory may store a necessary computer program or necessary instructions for implementing the function in the first aspect. The processor may execute the computer program or the instructions stored in the memory. When the computer program or the instructions is/are executed, the communication apparatus is enabled to implement the method according to any one of the possible designs or implementations in the first aspect.

In a possible design, the communication apparatus includes at least one processor and an interface circuit. The at least one processor is configured to: communicate with another apparatus through the interface circuit, and perform the method performed by the terminal device according to any one of the possible designs or implementations in the first aspect.

According to a sixth aspect, this application provides a communication apparatus. The communication apparatus may be a network device or a chip disposed in a network device. The communication apparatus has a function of implementing the second aspect. For example, the communication apparatus includes a corresponding module, unit, or means for performing the steps in the second aspect. The function, the unit, or the means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to send first information to a terminal device. The processing unit may be configured to perform some internal operations of the communication apparatus. Functions performed by the processing unit and the communication unit may correspond to the steps in the second aspect.

In a possible design, the communication apparatus includes a processor, and may further include a transceiver. The transceiver is configured to receive and send a signal, and the processor executes program instructions, to complete the method according to any one of the possible designs or implementations in the second aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the function in the second aspect. The processor may execute the computer program or the instructions stored in the memory. When the computer program or the instructions is/are executed, the communication apparatus is enabled to implement the method according to any one of the possible designs or implementations in the second aspect.

In a possible design, the communication apparatus includes a processor and a memory. The memory may store a necessary computer program or necessary instructions for implementing the function in the second aspect. The processor may execute the computer program or the instructions stored in the memory. When the computer program or the instructions is/are executed, the communication apparatus is enabled to implement the method according to any one of the possible designs or implementations in the second aspect.

In a possible design, the communication apparatus includes at least one processor and an interface circuit. The at least one processor is configured to: communicate with another apparatus through the interface circuit, and perform the method according to any one of the possible designs or implementations in the second aspect.

According to a seventh aspect, this application provides a communication apparatus. The communication apparatus may be a terminal device or a chip disposed in a terminal device. The communication apparatus has a function of implementing the third aspect. For example, the communication apparatus includes a corresponding module, unit, or means for performing the steps in the third aspect. The function, the unit, or the means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive first information from a network device. The processing unit may be configured to perform some internal operations of the communication apparatus. Functions performed by the processing unit and the communication unit may correspond to the steps in the third aspect.

In a possible design, the communication apparatus includes a processor, and may further include a transceiver. The transceiver is configured to receive and send a signal, and the processor executes program instructions, to complete the method according to any one of the possible designs or implementations in the third aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the function in the third aspect. The processor may execute the computer program or the instructions stored in the memory. When the computer program or the instructions is/are executed, the communication apparatus is enabled to implement the method according to any one of the possible designs or implementations in the third aspect.

In a possible design, the communication apparatus includes a processor and a memory. The memory may store a necessary computer program or necessary instructions for implementing the function in the third aspect. The processor may execute the computer program or the instructions stored in the memory. When the computer program or the instructions is/are executed, the communication apparatus is enabled to implement the method according to any one of the possible designs or implementations in the third aspect.

In a possible design, the communication apparatus includes at least one processor and an interface circuit. The at least one processor is configured to: communicate with another apparatus through the interface circuit, and perform the method performed by the terminal device according to any one of the possible designs or implementations in the third aspect.

According to an eighth aspect, this application provides a communication apparatus. The communication apparatus may be a network device or a chip disposed in a network device. The communication apparatus has a function of implementing the fourth aspect. For example, the communication apparatus includes a corresponding module, unit, or means for performing the steps in the fourth aspect. The function, the unit, or the means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to send first information to a terminal device. The processing unit may be configured to perform some internal operations of the communication apparatus. Functions performed by the processing unit and the communication unit may correspond to the steps in the fourth aspect.

In a possible design, the communication apparatus includes a processor, and may further include a transceiver. The transceiver is configured to receive and send a signal, and the processor executes program instructions, to complete the method according to any one of the possible designs or implementations in the fourth aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the function in the fourth aspect. The processor may execute the computer program or the instructions stored in the memory. When the computer program or the instructions is/are executed, the communication apparatus is enabled to implement the method according to any one of the possible designs or implementations in the fourth aspect.

In a possible design, the communication apparatus includes a processor and a memory. The memory may store a necessary computer program or necessary instructions for implementing the function in the fourth aspect. The processor may execute the computer program or the instructions stored in the memory. When the computer program or the instructions is/are executed, the communication apparatus is enabled to implement the method according to any one of the possible designs or implementations in the fourth aspect.

In a possible design, the communication apparatus includes at least one processor and an interface circuit. The at least one processor is configured to: communicate with another apparatus through the interface circuit, and perform the method according to any one of the possible designs or implementations in the fourth aspect.

According to a ninth aspect, this application provides a computer-readable storage medium. The computer storage medium stores computer-readable instructions; and when a computer reads and executes the computer-readable instructions, the computer is enabled to perform the method according to any one of the possible designs in the first aspect or the second aspect.

According to a tenth aspect, this application provides a computer program product; and when a computer reads and executes the computer program product, the computer is enabled to perform the method according to any one of the possible designs in the first aspect or the second aspect.

According to an eleventh aspect, this application provides a computer program product; and when a computer reads and executes the computer program product, the computer is enabled to perform the method according to any one of the possible designs in the third aspect or the fourth aspect.

According to a twelfth aspect, this application provides a chip. The chip includes a processor, and the processor is coupled to a memory, and is configured to read and execute a software program stored in the memory, to implement the method according to any one of the possible designs in the first aspect or the second aspect.

According to a thirteenth aspect, this application provides a chip. The chip includes a processor, and the processor is coupled to a memory, and is configured to read and execute a software program stored in the memory, to implement the method according to any one of the possible designs in the third aspect or the fourth aspect.

According to a fourteenth aspect, this application provides an uplink control information transmission method and an apparatus. The method may be performed by a terminal device, or may be performed by a chip used in the terminal device. An example in which an execution body is the terminal device is used for description below. The method includes: The terminal device receives configuration information from a network device, where the configuration information includes at least one PUCCH resource set, the PUCCH resource set includes at least one PUCCH resource subset, the at least one PUCCH resource subset includes A PUCCH resources, and A is greater than or equal to 2. The terminal device receives indication information, where the indication information is used to determine a target PUCCH resource subset in the at least one PUCCH resource set; and then the terminal device repeatedly transmit UCI for M times by using N PUCCH resources in the target PUCCH resource subset, where M and N are positive integers.

For example, in this embodiment of this application, the N PUCCH resources in the at least one PUCCH resource subset are independently configured.

In this embodiment of this application, because the network device preconfigures the PUCCH resource for the terminal device, the terminal device may repeatedly transmit the same UCI for M times based on the indication information of the network device by using the N PUCCH resources, so that a quantity of repeated transmissions of a PUCCH can be flexibly configured, thereby improving resource utilization.

In a possible design, the terminal device may first determine a target PUCCH resource set in the at least one PUCCH resource set based on a quantity of bits of the UCI. In this case, the indication information is used to determine the target PUCCH resource subset in the target PUCCH resource set.

In this embodiment of this application, the terminal device determines the target PUCCH resource set based on the quantity of bits of the UCI, and the network device may configure a plurality of PUCCH resource sets for the terminal device, so that the terminal device may first determine the target PUCCH resource set in the plurality of PUCCH resource sets based on the quantity of bits of the UCI. Therefore, a resource set is more flexibly configured, and no additional signaling overheads are required to indicate the target PUCCH resource set.

In a possible design, at least two of the N PUCCH resources have a same PUCCH format, and/or have a same frequency domain resource. In this manner, the at least two PUCCH resources may share configuration information of the PUCCH format and/or the frequency domain resource, so that signaling overheads can be reduced.

In a possible design, at least two of the N PUCCH resources have time domain resources of different symbol lengths. This manner helps flexibly configure a PUCCH resource, and improves resource utilization.

In a possible design, the indication information is further used to indicate a quantity Q of repeated transmissions; or the terminal device receives fourth indication information, where the fourth indication information is used to indicate the quantity Q of repeated transmissions, and Q is a positive integer. The terminal device may determine N×Q PUCCH resources based on the N PUCCH resources and the quantity Q of repeated transmissions, and then the terminal device repeatedly transmits the UCI for M times on the N×Q PUCCH resources.

In this embodiment of this application, the terminal device may repeatedly transmit the same UCI based on an indication of the network device by using the N×Q PUCCH resources, so that a quantity of repeated transmissions of a PUCCH can be flexibly configured, thereby improving resource utilization. In addition, the terminal device may determine the N×Q PUCCH resources based on a parameter Q by using configuration information of the N PUCCH resources and the parameter Q. Compared with a case in which the N×Q PUCCH resources needs to be directly configured, this can reduce signaling overheads.

In a possible design, PUCCH resources used for S times of repeated transmitting of the UCI in the M times of repeated transmitting of the UCI occupy symbols in one slot, and S is greater than or equal to 2 and is less than or equal to M; or PUCCH resources used for the M times of repeated transmitting of the UCI are in different slots, and time domain positions of at least two of the PUCCH resources used for the M times of repeated transmitting of the UCI are different or partially overlap in the slots.

In this way, a delay between the N PUCCH resources determined in this embodiment of this application is short, so that a UCI transmission delay can be reduced to some extent, and a delay requirement of a service having a high delay requirement can be met.

In a possible design, the indication information is carried in downlink control information DCI.

In a possible design, time domain resources used for the M times of repeated transmitting of the UCI are resources in M sub-slots.

In a possible design, the M sub-slots are at least two consecutive sub-slots.

According to a fifteenth aspect, an embodiment of this application provides an uplink control information transmission method. The method may be performed by a network device or a chip used in the network device. An example in which an execution body is the network device is used for description below. The method includes: The network device sends configuration information, where the configuration information includes at least one physical uplink control channel PUCCH resource set, the PUCCH resource set includes at least one PUCCH resource subset, the at least one PUCCH resource subset includes A PUCCH resources, and A is greater than or equal to 2. The network device sends indication information, where the indication information is used to indicate to determine a target PUCCH resource subset in the at least one PUCCH resource set. The network device repeatedly receives uplink control information UCI for M times by using N PUCCH resources in the target PUCCH resource subset, where M and N are positive integers.

In a possible design, at least two of the N PUCCH resources have a same PUCCH format, and/or have a same frequency domain resource.

In a possible design, at least two of the N PUCCH resources have time domain resources of different symbol lengths.

In this embodiment of this application, symbols lengths of the N PUCCH time domains may be different. This improves PUCCH resource configuration flexibility.

In a possible design, the indication information is further used to indicate a quantity Q of repeated transmissions; or fourth indication information is sent, where the fourth indication information is used to indicate the quantity Q of repeated transmissions, and Q is a positive integer. A terminal device determines N×Q PUCCH resources based on the N PUCCH resources and the quantity Q of repeated transmissions, and repeatedly receives the UCI for M times on the N×Q PUCCH resources by using the N×Q PUCCH resources.

In a possible design, PUCCH resources used by the terminal device for S times of repeated transmitting of the UCI in the M times of repeated transmitting of the UCI occupy symbols in one slot, and S is greater than or equal to 2 and is less than or equal to M; or PUCCH resources used for the M times of repeated transmitting of the UCI are in different slots, and time domain positions of at least two of the PUCCH resources used for the M times of repeated transmitting of the UCI are different or partially overlap in the slots.

Because the communication method described in the fifteenth aspect corresponds to the communication method described in the fourteenth aspect, for related beneficial effects of the communication method described in the fifteenth aspect, refer to the fourteenth aspect. Details are not described herein again.

According to a sixteenth aspect, this application provides an uplink control information transmission method and an apparatus. The method may be performed by a terminal device, or may be performed by a chip used in the terminal device. An example in which an execution body is the terminal device is used for description below. The method includes: The terminal device receives indication information. The terminal device determines a first PUCCH resource in at least one PUCCH resource set based on the indication information. The terminal device repeatedly transmits uplink control information UCI for M times by using the first PUCCH resource, where M is a positive integer.

In this embodiment of this application, because a network device preconfigures a PUCCH resource, the terminal device may transmit the UCI based on an indication of the network device and a quantity of repeated transmissions corresponding to the PUCCH resource, so that a quantity of repeated transmissions of a PUCCH can be flexibly configured, thereby improving resource utilization.

In a possible design, the indication information is further used to indicate a quantity Z of repeated transmissions; or the terminal device receives second indication information, where the second indication information is used to indicate the quantity Z of repeated transmissions, and N is a positive integer. The terminal device determines the first PUCCH resource and the quantity Z of repeated transmissions in the at least one PUCCH resource set based on the indication information; and the terminal device repeatedly transmits the UCI for M times based on the first PUCCH resource and the quantity Z of repeated transmissions. In this embodiment of this application, because the network device preconfigures the PUCCH resource and the quantity of repeated transmissions, the terminal device may transmit the UCI based on the indication of the network device and the quantity of repeated transmissions corresponding to the PUCCH resource, so that the quantity of repeated transmissions of the PUCCH can be flexibly configured, thereby improving resource utilization.

In a possible design, the quantity Z of repeated transmissions is configured for the first PUCCH resource in the PUCCH resource set. In a possible design, the indication information is further used to indicate a quantity T of interval symbols, where T is a positive integer; or the terminal device receives fifth indication information, where the fifth indication information is used to indicate the quantity T of the interval symbols. The terminal device repeatedly transmits the uplink control information UCI for M times based on the first PUCCH resource and the quantity T of interval symbols.

In a possible design, the quantity T of interval symbols is configured for the first PUCCH resource in the PUCCH resource set.

In this embodiment of this application, because the network device preconfigures the PUCCH resource and the quantity T of interval symbols, the terminal device may determine, based on the indication of the network device and a default quantity of repeated transmissions corresponding to the PUCCH resource, Z PUCCH resources of the quantity T of interval symbols, and transmit the UCI by using the Z PUCCH resources, so that the quantity of repeated transmissions of the PUCCH can be flexibly configured, thereby improving resource utilization. In addition, the quantity T of interval symbols is configured, so that a distance between two PUCCH resources can be flexibly configured, to provide processing time for the terminal device that sends the UCI on the two PUCCH resources.

In a possible design, the indication information is further used to indicate the quantity T of interval symbols and the quantity Z of repeated transmissions. The terminal device determines the first PUCCH resource, the quantity Z of repeated transmissions, and the quantity T of interval symbols in the at least one PUCCH resource set based on the indication information. The terminal device determines the Z PUCCH resources based on the first PUCCH resource, the quantity Z of repeated transmissions, and the quantity T of interval symbols. Then, the terminal device repeatedly sends the UCI for M times by using the Z PUCCH resources.

In this embodiment of this application, because the network device preconfigures the PUCCH resource, the quantity Z of repeated transmissions, and the quantity T of interval symbols, the terminal device may determine, based on the indication of the network device and the quantity Z of repeated transmissions corresponding to the PUCCH resource, the Z PUCCH resources of the quantity T of interval symbols, and transmit the UCI by using the Z PUCCH resources, so that the quantity of repeated transmissions of the PUCCH can be flexibly configured, thereby improving resource utilization. In addition, both the quantity T of interval symbols and the quantity Z of repeated transmissions are determined by using one piece of indication information, so that signaling overheads can be effectively reduced.

In a possible design, when the at least one PUCCH resource set includes at least two PUCCH resource sets, the terminal device may first determine a target PUCCH resource set in the at least two PUCCH resource sets based on a quantity of bits of the UCI; and then determine the first PUCCH resource in the target PUCCH resource set based on the indication information.

In this embodiment of this application, the target PUCCH resource set is selected by using the quantity of bits of the UCI. The network device can be allowed to configure a plurality of PUCCH resource sets for the terminal device, so that a quantity of configured PUCCH resource sets is increased. This can be more flexibly applied to UCI transmission, and improve resource utilization.

In a possible design, the quantity Z of repeated transmissions is configured by the network device for the first PUCCH resource in the at least one PUCCH resource set. In other words, the network device preconfigures the PUCCH resource and the quantity of repeated transmissions corresponding to the PUCCH resource, to flexibly configure the quantity of repeated transmissions of the PUCCH resource, and reduce indication signaling overheads.

In a possible design, the method further includes: The terminal device determines a target PUCCH resource set in the at least two PUCCH resource sets based on the quantity Z of repeated transmissions; or determines a target PUCCH resource set in the at least two PUCCH resource sets based on the quantity Z of repeated transmissions and a quantity of bits of the UCI. The terminal device determines the first PUCCH resource in the target PUCCH resource set based on the indication information.

In a possible design, the indication information is carried in downlink control information DCI.

In a possible design, a PUCCH resource used for each of the M times of repeated transmitting of the UCI occupies a same number of symbols in time domain.

In a possible design, time domain resources used for the M times of repeated transmitting of the UCI are resources in M sub-slots.

In a possible design, the M sub-slots are at least two consecutive sub-slots.

In a possible design, a format of the first PUCCH resource is a format 0 or a format 2.

According to a seventeenth aspect, an embodiment of this application provides an uplink control information transmission method. The method may be performed by a network device or a chip used in the network device. An example in which an execution body is the network device is used for description below. The method includes: The network device sends indication information, where the indication information is used to indicate the first PUCCH resource. The network device repeatedly receives uplink control information UCI for M times based on the first PUCCH resource, where M is a positive integer.

In a possible design, the method further includes: The network device determines a quantity Z of repeated transmissions, where the indication information is further used to indicate the quantity Z of repeated transmissions; or sends second indication information, where the second indication information is used to indicate the quantity Z of repeated transmissions, and Z is a positive integer. The network device repeatedly receives the uplink control information UCI for M times based on the first PUCCH resource and the quantity Z of repeated transmissions.

In a possible design, the method further includes: The network device determines a quantity T of interval symbols, where the indication information is further used to indicate the quantity T of interval symbols; or sends fifth indication information, where the fifth indication information is used to indicate the quantity T of interval symbols. The network device repeatedly receives the uplink control information UCI for M times based on the first PUCCH resource and the quantity T of interval symbols.

In a possible design, the indication information is further used to indicate the quantity T of interval symbols and the quantity Z of repeated transmissions. The network device determines Z PUCCH resources based on the first PUCCH resource, the quantity Z of repeated transmissions, and the quantity T of interval symbols. The network device repeatedly receives the UCI for M times by using the Z PUCCH resources.

In a possible design, that the network device determines a quantity Z of repeated transmissions further includes: sending configuration information, where the configuration information includes a quantity of repeated transmissions corresponding to at least one PUCCH resource in the at least one PUCCH resource set; the configuration information includes a quantity of repeated transmissions corresponding to the at least one PUCCH resource set; or the configuration information includes a maximum allowed quantity of repeated transmissions corresponding to the at least one PUCCH resource set and a quantity of repeated transmissions corresponding to at least one PUCCH resource in the at least one PUCCH resource set.

In a possible design, the at least one PUCCH resource set includes a quantity of repeated transmissions corresponding to a PUCCH resource in the at least one PUCCH resource set;

the at least one PUCCH resource set includes the quantity of repeated transmissions corresponding to the at least one PUCCH resource set; or the at least one PUCCH resource set includes the maximum allowed quantity of repeated transmissions corresponding to the at least one PUCCH resource set and a quantity of repeated transmissions corresponding to a PUCCH resource in the at least one PUCCH resource set.

In a possible design, the indication information is carried in downlink control information DCI.

In a possible design, a PUCCH resource used for each of the M times of repeated transmitting of the UCI occupies a same number of symbols in time domain.

In a possible design, time domain resources used for the M times of repeated transmitting of the UCI are resources in M sub-slots.

In a possible design, the M sub-slots are at least two consecutive sub-slots.

In a possible design, a format of the first PUCCH resource is a format 0 or a format 2.

Because the communication method described in the seventeenth aspect corresponds to the communication method described in the sixteenth aspect, for related beneficial effects of the communication method described in the seventeenth aspect, refer to the sixteenth aspect. Details are not described herein again.

According to an eighteenth aspect, this application provides a communication apparatus. The communication apparatus may be a terminal device or a chip disposed in a terminal device. The communication apparatus has a function of implementing the fourteenth aspect or the sixteenth aspect. For example, the communication apparatus includes a corresponding module, unit, or means for performing the steps in the fourteenth aspect or the sixteenth aspect. The function, the unit, or the means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive indication information from a network device. The processing unit may be configured to perform some internal operations of the communication apparatus. Functions performed by the processing unit and the communication unit may correspond to the steps in the fourteenth aspect or the sixteenth aspect.

In a possible design, the communication apparatus includes a processor, and may further include a transceiver. The transceiver is configured to receive and send a signal, and the processor executes program instructions, to complete the method according to any one of the possible designs or implementations in the fourteenth aspect or the sixteenth aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the function in the fourteenth aspect or the sixteenth aspect. The processor may execute the computer program or the instructions stored in the memory. When the computer program or the instructions is/are executed, the communication apparatus is enabled to implement the method according to any one of the possible designs or implementations in the fourteenth aspect or the sixteenth aspect.

In a possible design, the communication apparatus includes a processor and a memory. The memory may store a necessary computer program or necessary instructions for implementing the function in the fourteenth aspect or the sixteenth aspect. The processor may execute the computer program or the instructions stored in the memory. When the computer program or the instructions is/are executed, the communication apparatus is enabled to implement the method according to any one of the possible designs or implementations in the fourteenth aspect or the sixteenth aspect.

In a possible design, the communication apparatus includes at least one processor and an interface circuit. The at least one processor is configured to: communicate with another apparatus through the interface circuit, and perform the method performed by the terminal device according to any one of the possible designs or implementations in the fourteenth aspect or the sixteenth aspect.

According to a nineteenth aspect, this application provides a communication apparatus. The communication apparatus may be a network device or a chip disposed in a network device. The communication apparatus has a function of implementing the fifteenth aspect or the seventeenth aspect. For example, the communication apparatus includes a corresponding module, unit, or means for performing the steps in the fifteenth aspect or the seventeenth aspect. The function, the unit, or the means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to send indication information to a terminal device. The processing unit may be configured to perform some internal operations of the communication apparatus. Functions performed by the processing unit and the communication unit may correspond to the steps in the fifteenth aspect or the seventeenth aspect.

In a possible design, the communication apparatus includes a processor, and may further include a transceiver. The transceiver is configured to receive and send a signal, and the processor executes program instructions, to complete the method according to any one of the possible designs or implementations in the fifteenth aspect or the seventeenth aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions for implementing the function in the fifteenth aspect or the seventeenth aspect. The processor may execute the computer program or the instructions stored in the memory. When the computer program or the instructions is/are executed, the communication apparatus is enabled to implement the method according to any one of the possible designs or implementations in the fifteenth aspect or the seventeenth aspect.

In a possible design, the communication apparatus includes a processor and a memory. The memory may store a necessary computer program or necessary instructions for implementing the function in the fifteenth aspect or the seventeenth aspect. The processor may execute the computer program or the instructions stored in the memory. When the computer program or the instructions is/are executed, the communication apparatus is enabled to implement the method according to any one of the possible designs or implementations in the fifteenth aspect or the seventeenth aspect.

In a possible design, the communication apparatus includes at least one processor and an interface circuit. The at least one processor is configured to: communicate with another apparatus through the interface circuit, and perform the method according to any one of the possible designs or implementations in the fifteenth aspect or the seventeenth aspect.

According to a twentieth aspect, an embodiment of this application provides a computer-readable storage medium. The computer storage medium stores computer-readable instructions; and when a computer reads and executes the computer-readable instructions, the computer is enabled to perform the method according to any one of the possible designs in the fourteenth aspect or the sixteenth aspect.

According to a twenty-first aspect, an embodiment of this application provides a computer-readable storage medium. The computer storage medium stores computer-readable instructions; and when a computer reads and executes the computer-readable instructions, the computer is enabled to perform the method according to any one of the possible designs in the fifteenth aspect or the seventeenth aspect.

According to a twenty-second aspect, this application provides a computer program product; and when a computer reads and executes the computer program product, the computer is enabled to perform the method according to any one of the possible designs in the fourteenth aspect or the sixteenth aspect.

According to a twenty-third aspect, this application provides a computer program product; and when a computer reads and executes the computer program product, the computer is enabled to perform the method according to any one of the possible designs in the fifteenth aspect or the seventeenth aspect.

According to a twenty-fourth aspect, this application provides a chip. The chip includes a processor, and the processor is coupled to a memory, and is configured to read and execute a software program stored in the memory, to implement the method according to any one of the possible designs in the fourteenth aspect or the sixteenth aspect.

According to a twenty-fifth aspect, this application provides a chip. The chip includes a processor, and the processor is coupled to a memory, and is configured to read and execute a software program stored in the memory, to implement the method according to any one of the possible designs in the fifteenth aspect or the seventeenth aspect.

DESCRIPTION OF EMBODIMENTS

Figure 1:
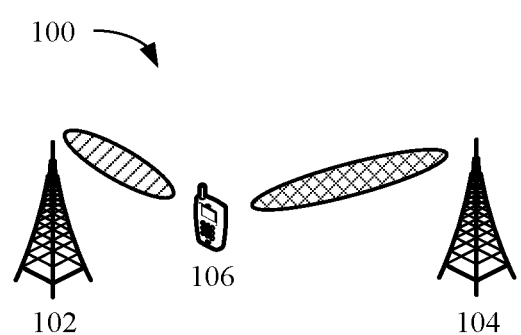
FIG. 1 is a schematic diagram of a communication system to which a communication method according to an embodiment of this application is applicable.

Embodiments of this application may be applied to but are not limited to a 5G system. The 5G system is also referred to as a new radio (NR) system. Embodiments of this application may also be applied to 3rd generation partnership project (3GPP) related cellular systems such as an LTE system, a long term evolution-advanced (LTE-A) system, or an enhanced long term evolution (eLTE) system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, the term "for example" in embodiments of this application is used to represent giving an example, an illustration, or a description. Any embodiment or design scheme described as the "example" in this application should not be explained as being more preferred or having more advantages than another embodiment or design scheme. Exactly, the word "example" is used to present a concept in a specific manner.

In embodiments of this application, the term "information", "signal", "message", or "channel" may sometimes be interchangeably used. It should be noted that when differences are not emphasized, meanings to be expressed are the same. The terms "of", "relevant", and "corresponding" may sometimes be interchangeably used. It should be noted that when differences are not emphasized, meanings to be expressed are the same.

In embodiments of this application, a first PUCCH resource and a PUCCH 1 may sometimes be alternately used. Similarly, a second PUCCH resource and a PUCCH 2 resource may sometimes be alternately used, a third PUCCH resource and a PUCCH 3 resource may sometimes be alternately used, and a fourth PUCCH resource and a PUCCH 4 resource may sometimes be alternately used, a fifth PUCCH resource and a PUCCH 5 resource may sometimes be alternately used. It should be noted that when differences are not emphasized, meanings to be expressed are the same.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

Embodiments of this application may be applied to a time division duplex (TDD) scenario, or may be applied to a frequency division duplex (FDD) scenario.

Embodiments of this application may be applied to a conventional typical network or a future UE-centric network. A non-cell network architecture is introduced into the UE-centric network. To be specific, a large quantity of small cells are deployed in a specific area, to form a hyper cell, where each small cell is a transmission point (TP) or a TRP in the hyper cell, and is connected to a central controller. When UE moves in the hyper cell, a network side device selects a new sub-cluster for the UE in real time to serve the UE, to avoid a real cell handover, and implement UE service continuity. The network side device includes a wireless network device.

In embodiments of this application, an NR network scenario in a wireless communication network is used as an example to describe some scenarios. It should be noted that the solutions in embodiments of this application may also be applied to another wireless communication network, and a corresponding name may also be replaced with a name of a corresponding function in the another wireless communication network.

For ease of understanding of embodiments of this application, the communication system shown in FIG. 1 is first used as an example to describe in detail a communication system to which embodiments of this application are applicable. FIG. 1 is a schematic diagram of a communication system to which a communication method according to an embodiment of this application is applicable. As shown in FIG. 1, the communication system 100 includes a network device 102 and a terminal device 106. A plurality of antennas may be configured for the network device 102, and a plurality of antennas may also be configured for the terminal device. Optionally, the communication system may further include a network device 104, and a plurality of antennas may also be configured for the network device 104.

It should be understood that the network device 102 or the network device 104 may further include a plurality of components (e.g., a processor, a modulator, a multiplexer, a demodulator, or a de-multiplexer) related to signal sending and receiving.

The network device is a device that has a wireless transceiver function or a chip that can be disposed in the device. The device includes but is not limited to: an evolved NodeB (eNB), a radio network controller (RNC), a NodeB (NB), a base station controller (BSC), a base transceiver station (BTS), a home base station (e.g., a home evolved NodeB or a home NodeB, HNB), a baseband unit (BBU), an access point (AP) in a wireless fidelity (Wi-Fi) system, a wireless relay node, a wireless backhaul node, a transmission point (transmission and reception point, TRP; or transmission point, TP), and the like; or may be a gNB or a transmission point (TRP or TP) in 5G, for example, an NR system, one or one group of antenna panels (including a plurality of antenna panels) of a base station in a 5G system, or a network node, for example, a baseband unit (BBU) or a distributed unit (DU), forming a gNB or a transmission point.

In some deployments, the gNB may include a centralized unit (CU) and a DU. The gNB may further include a radio frequency unit (radio unit, RU). The CU implements a part of functions of the gNB, and the DU implements a part of the functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including the CU node and the DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. In embodiments of this application, the terminal device may be a mobile phone, a tablet computer (Pad), an intelligent printer, a train detector, a gas station detector, a computer that has a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city (smart city), a wireless terminal in a smart home, or the like. An application scenario is not limited in embodiments of this application. In this application, the foregoing terminal device and the chip that can be disposed in the foregoing terminal device are collectively referred to as a terminal device.

The network device 102 and the network device 104 each may communicate with a plurality of terminal devices (e.g., the terminal device 106 shown in the figure). The network device 102 and the network device 104 may communicate with any quantity of terminal devices similar to the terminal device 106. However, it should be understood that a terminal device communicating with the network device 102 and a terminal device communicating with the network device 104 may be the same or may be different. The terminal device 106 shown in FIG. 1 may simultaneously communicate with the network device 102 and the network device 104. However, only one possible scenario is shown. In some scenarios, the terminal device may communicate with only the network device 102 or the network device 104. This is not limited in this application.

It should be understood that FIG. 1 is merely a simplified schematic diagram used as an example for ease of understanding. The communication system may further include another network device or another terminal device that is not shown in FIG. 1.

Figure 2:
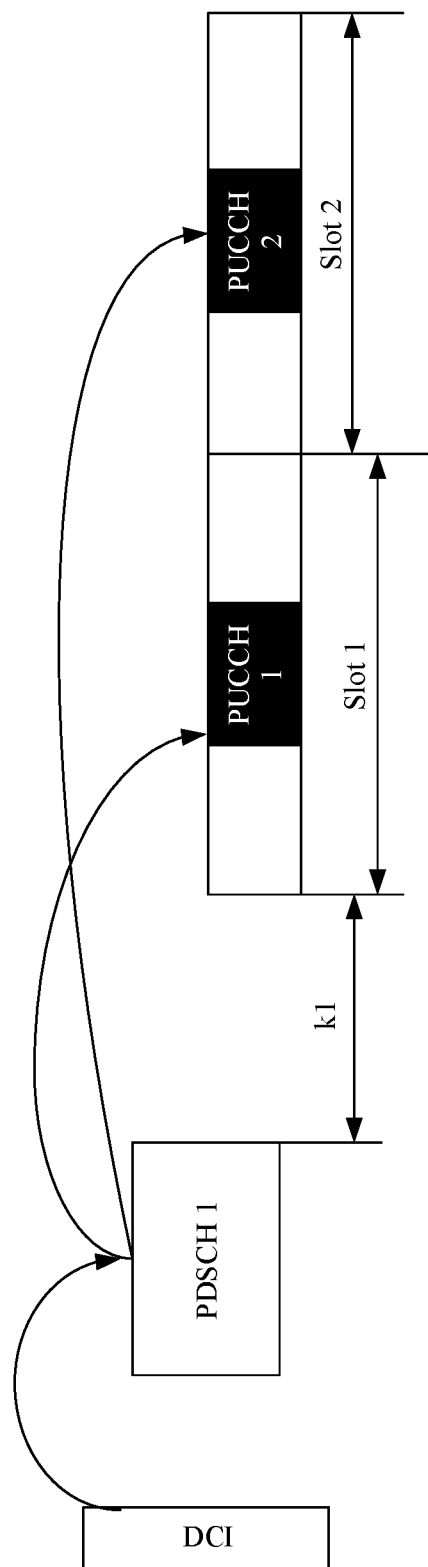
FIG. 2 is a schematic diagram of an application scenario of a communication method according to an embodiment of this application.

Currently, a problem in an uplink control information transmission method is as follows: A network device configures a quantity of repeated transmissions of a terminal device by using configuration information. As a result, the terminal device always repeatedly transmits a PUCCH in N uplink slots. For example, as shown in FIG. 2, the network device may send, to a terminal device in a cell, downlink control information (DCI) carried on a physical downlink control channel (PDCCH), and the DCI is used to schedule a physical downlink shared channel (PDSCH) 1 that carries service data 1. The network device further sends configuration information to the terminal device. The configuration information indicates a PUCCH 1 used for a hybrid automatic repeat request (HARQ) feedback of the service data 1. In addition, the terminal device further receives a configuration message from higher layer radio resource control (radio resource control, RRC) signaling. The configuration message indicates a quantity of repeated transmissions of the PUCCH 1 resource for the hybrid automatic repeat request (HARQ) feedback of the service data 1 (where it is agreed in a protocol that one time of sending of feedback information on the PUCCH 1 belongs to one time of the quantity of repeated transmissions, for example, N is 2). Therefore, after receiving the PDSCH 1, the terminal device sends HARQ feedback information of the service data 1 on the PUCCH 1 in a slot 1, and repeatedly transmits the HARQ feedback information of the service data 1 once on a PUCCH 2 in a slot 2. Then, if the terminal device receives a PDSCH 2 that carries service data 2, the terminal device still sends, according to the foregoing method, HARQ feedback information of the service data 2 on a PUCCH 3 configured by the network device, and repeatedly sends the HARQ feedback information of the service data 2 once on a PUCCH 4 in a subsequent slot. It can be learned that a current manner of configuring the quantity of repeated transmissions of the PUCCH resource is not flexible enough, and PUCCH resource utilization is reduced.

To resolve the problem that the manner of configuring the quantity of repeated transmissions of the PUCCH resource is inflexible, this application provides a first communication method. According to the method, the quantity of repeated transmissions can be configured for the PUCCH resource in a PUCCH resource set corresponding to the terminal device.

Embodiment 1

Figure 3:
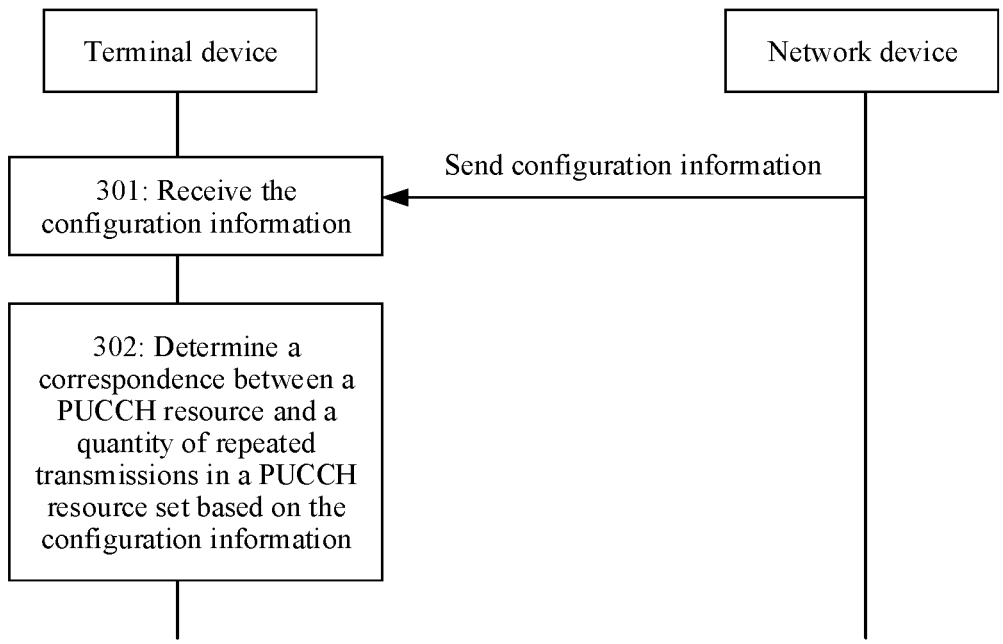
FIG. 3 is a schematic flowchart of another communication method according to an embodiment of this application.

FIG. 3 is a schematic flowchart of a communication method according to an embodiment of this application. The method specifically includes the following steps.

Step 301: A terminal device receives configuration information from a network device, where the configuration information includes a parameter indicating a quantity of repeated transmissions.

In other words, the network device configures a parameter for a PUCCH resource set or a PUCCH resource corresponding to the terminal device, and the parameter is used to indicate the quantity of repeated transmissions of the PUCCH resource. The quantity of repeated transmissions corresponding to the PUCCH resource set or the PUCCH resource in the PUCCH resource set is independently configured by the network device. The PUCCH resource set in this specification actually refers to an information element of the PUCCH resource set.

Figure 4A:
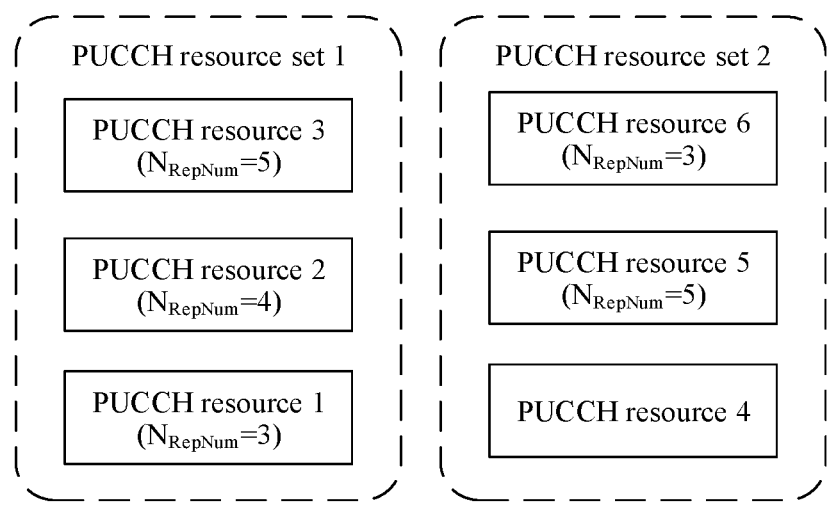
FIG. 4A to FIG. 4C are schematic diagrams of PUCCH resource sets according to an embodiment of this application.

In a possible embodiment, the parameter may be a quantity $N_{RepNum}$ of repeated transmissions corresponding to at least one PUCCH resource in at least one PUCCH resource set. For example, as shown in FIG. 4A, it is assumed that a PUCCH resource set 1 preconfigured by the network device for the terminal device includes a PUCCH resource 1, a PUCCH resource 2, and a PUCCH resource 3. The configuration information may include that $N_{RepNum}$ corresponding to the PUCCH resource 1 is 3, $N_{RepNum}$ corresponding to the PUCCH resource 2 is 4, and $N_{RepNum}$ corresponding to the PUCCH resource 5 is 5. For another example, it is assumed that the PUCCH resource sets preconfigured by the network device for the terminal device further include a PUCCH resource set 2, and the PUCCH resource set 2 includes a PUCCH resource 4, a PUCCH resource 5, and a PUCCH resource 6. The configuration information may further include that $N_{RepNum}$ corresponding to the PUCCH resource 5 is 5, and $N_{RepNum}$ corresponding to the PUCCH resource 6 is 3. $N_{RepNum}$ corresponding to the PUCCH resource 4 is set by default.

Figure 4B:
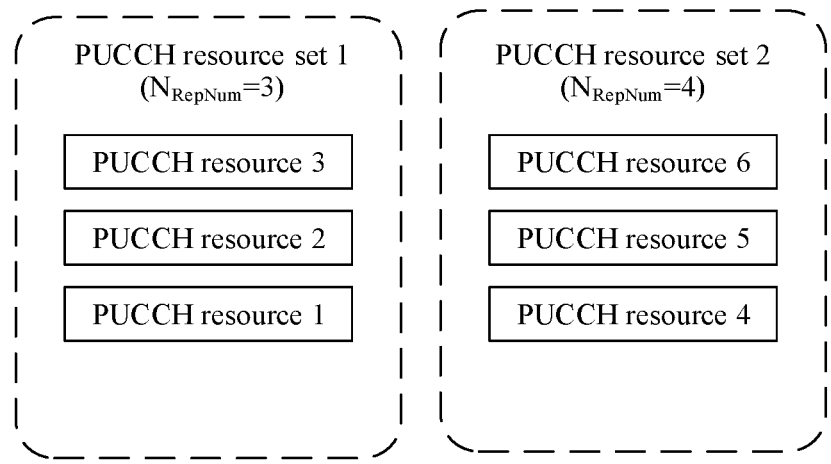

In another possible embodiment, the parameter may be a quantity $N_{RepNum}$ of repeated transmissions corresponding to at least one PUCCH resource set. For example, as shown in FIG. 4B, it is assumed that the network device preconfigures a PUCCH resource set 1 and a PUCCH resource set 2 for the terminal device. The configuration information may include that $N_{RepNum}$ corresponding to the PUCCH resource set 1 is 3, and $N_{RepNum}$ corresponding to the PUCCH resource set 2 is 4.

Figure 4C:
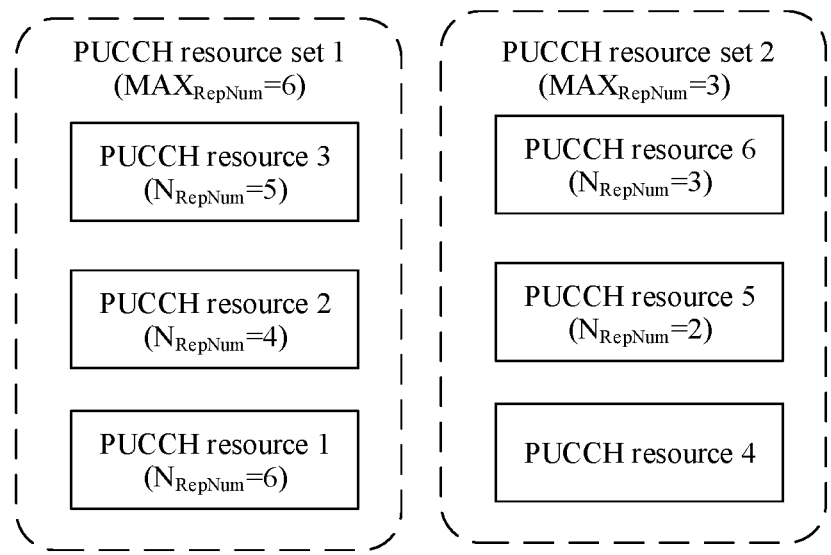

In another possible embodiment, the parameter may be a maximum allowed quantity $MAT_{RepNum}$ of repeated transmissions corresponding to at least one PUCCH resource set and a quantity of repeated transmissions corresponding to a PUCCH resource in the PUCCH resource set. The quantity of repeated transmissions corresponding to the PUCCH resource in the PUCCH resource set is not greater than $MAT_{RepNum}$. For example, as shown in FIG. 4C, it is assumed that the network device preconfigures a PUCCH resource set 1 and a PUCCH resource set 2 for the terminal device. The configuration information may include that $MAT_{RepNum}$ corresponding to the PUCCH resource set 1 is 6, and $MAT_{RepNum}$ corresponding to the PUCCH resource set 2 is 3. In addition, the configuration information may include that, in the PUCCH resource set 1, $N_{RepNum}$ corresponding to a PUCCH resource 1 is 6, $N_{RepNum}$ corresponding to a PUCCH resource 2 is 4, and $N_{RepNum}$ corresponding to a PUCCH resource 3 is 5; and in the PUCCH resource set 2, $N_{RepNum}$ corresponding to a PUCCH resource 5 is 2, and $N_{RepNum}$ corresponding to a PUCCH resource 6 is 3. $N_{RepNum}$ corresponding to a PUCCH resource 4 is set by default.

Step 302: Determine a correspondence between the PUCCH resource and the quantity of repeated transmissions in the PUCCH resource set based on the configuration information.

In a first possible embodiment, if the parameter is the quantity $N_{RepNum}$ of repeated transmissions corresponding to the at least one PUCCH resource in the at least one PUCCH resource set, the terminal device may determine the correspondence between the PUCCH resource and the quantity of repeated transmissions. For a PUCCH resource whose $N_{RepNum}$ is set by default, the terminal device may determine that a quantity $N_{RepNum}$ of repeated transmissions corresponding to the default PUCCH resource is a default value. For example, for FIG. 4A, a one-to-one correspondence, between the PUCCH resource and the quantity of repeated transmissions in the PUCCH resource set 1, that is determined by the terminal device may be shown in Table 1, and a one-to-one correspondence, between the PUCCH resource and the quantity of repeated transmissions in the PUCCH resource set 2, that is determined by the terminal device may be shown in Table 1a.

TABLE 1

| Index value | Identifier of the PUCCH resource | Quantity $N_{RepNum}$ of repeated transmissions |
| --- | --- | --- |
| 1 | PUCCH resource 1 | 3 |
| 2 | PUCCH resource 2 | 4 |
| 3 | PUCCH resource 3 | 5 |

TABLE 1a

| Index value | Identifier of the PUCCH resource | Quantity $N_{RepNum}$ of repeated transmissions |
| --- | --- | --- |
| 1 | PUCCH resource 4 | Default value (default) |
| 2 | PUCCH resource 5 | 5 |
| 3 | PUCCH resource 6 | 3 |

In a possible embodiment, if the parameter is the quantity $N_{RepNum}$ of repeated transmissions corresponding to the at least one PUCCH resource set, the terminal device determines that quantities of repetitions corresponding to all PUCCH resources in one PUCCH resource set are the same as $N_{RepNum}$. For example, for FIG. 4B, a one-to-one correspondence, between the PUCCH resource and the quantity of repeated transmissions in the PUCCH resource set 1, that is determined by the terminal device may be shown in Table 2, and a one-to-one correspondence, between the PUCCH resource and the quantity of repeated transmissions in the PUCCH resource set 2, that is determined by the terminal device may be shown in Table 2a.

TABLE 2

| Index value | Identifier of the PUCCH resource | Quantity $N_{RepNum}$ of repeated transmissions |
| --- | --- | --- |
| 1 | PUCCH resource 1 | 3 |
| 2 | PUCCH resource 2 | 3 |
| 3 | PUCCH resource 3 | 3 |

TABLE 2a

| Index value | Identifier of the PUCCH resource | Quantity $N_{RepNum}$ of repeated transmissions |
| --- | --- | --- |
| 4 | PUCCH resource 4 | 4 |
| 5 | PUCCH resource 5 | 4 |
| 6 | PUCCH resource 6 | 4 |

In a possible embodiment, if the parameter is the maximum allowed quantity $MAT_{RepNum}$ of repeated transmissions corresponding to the at least one PUCCH resource set and the quantity of repeated transmissions corresponding to the PUCCH resource in the PUCCH resource set, the terminal device may determine the correspondence between the PUCCH resource and the quantity of repeated transmissions. For a PUCCH resource whose $N_{RepNum}$ is set by default, the terminal device may determine that a quantity $N_{RepNum}$ of repeated transmissions corresponding to the default PUCCH resource is a default value. For example, for FIG. 4C, a one-to-one correspondence, between the PUCCH resource and the quantity of repeated transmissions in the PUCCH resource set 1, that is determined by the terminal device may be shown in Table 3, and a one-to-one correspondence between the PUCCH resource and the quantity of repeated transmissions in the PUCCH resource set 2 may be shown in Table 3a.

TABLE 3

| Index value | Identifier of the PUCCH resource | Quantity $N_{RepNum}$ of repeated transmissions |
| --- | --- | --- |
| 1 | PUCCH resource 1 | 6 |
| 2 | PUCCH resource 2 | 4 |
| 3 | PUCCH resource 3 | 5 |

TABLE 3a

| Index value | Identifier of the PUCCH resource | Quantity $N_{RepNum}$ of repeated transmissions |
| --- | --- | --- |
| 4 | PUCCH resource 4 | Default value (default) |
| 5 | PUCCH resource 5 | 2 |
| 6 | PUCCH resource 6 | 3 |

It should be noted that step 301 may also be set by default, and the foregoing parameter corresponding to the PUCCH resource in the PUCCH resource set may be predefined according to a standard. In other words, the quantity of repeated transmissions corresponding to the resource in the PUCCH resource set or the quantity of repeated transmissions corresponding to the PUCCH resource set may be agreed on in advance in a protocol.

Embodiment 2

In Embodiment 2, a possible implementation of an uplink control information transmission method is described based on Embodiment 1.

Figure 5:
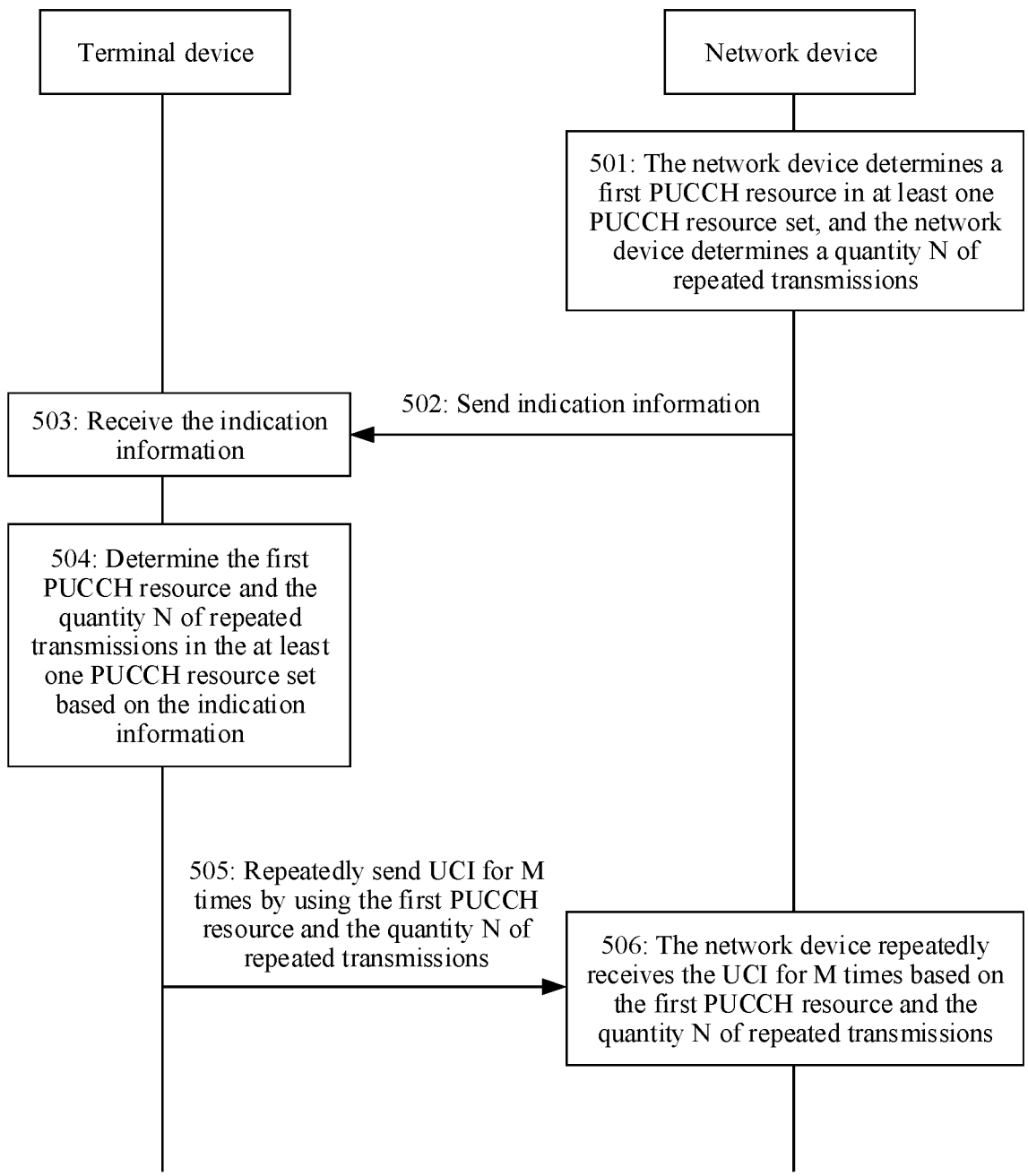
FIG. 5 is a schematic flowchart of an uplink control information transmission method according to an embodiment of this application.

FIG. 5 is a schematic flowchart corresponding to an uplink control information transmission method according to Embodiment 2 of this application. As shown in FIG. 5, the method includes the following steps.

Step 501: A network device determines a first PUCCH resource in at least one PUCCH resource set, and the network device determines a quantity N of repeated transmissions.

Specifically, the PUCCH resource is used to carry UCI. The UCI may include one or a combination of a plurality of a hybrid automatic repeat request (HARQ) acknowledgement/negative acknowledgement (ACK/NACK) message, a scheduling request (SR), and/or channel state information (CSI), where the CSI may further include one or a combination of a plurality of a channel quality indication (CQI), a precoding matrix index (PMI), or a rank indication (RI). In this embodiment of this application, the first PUCCH resource is used to carry first UCI.

Step 502: The network device sends indication information to a terminal device, where the indication information is used to indicate the first PUCCH resource and the quantity N of repeated transmissions.

The indication information may be carried in signaling sent by the network device to the terminal device. The signaling in this embodiment of this application may be one or more of radio resource control (RRC) signaling, a media access control (MAC) control element (CE), or physical layer signaling. The physical layer signaling herein may be downlink control information (DCI). Specifically, specific signaling for carrying the indication information may be determined based on a protocol agreement, or based on a protocol agreement and an actual scenario. This is not limited herein.

In a possible embodiment, the network device may implicitly indicate the first PUCCH resource and the quantity N of repeated transmissions in the indication information. For example, the network device indicates the first PUCCH resource and the quantity N of repetitions by using PUCCH resource indication information (PUCCH resource indicator, PRI) or a semi-persistent indication parameter in the DCI. For example, with reference to Table 1, a bit of the PRI is "1", and "1" is used to indicate the PUCCH resource 1 and the quantity 3 of repeated transmissions in the row corresponding to the index value 1 in Table 1.

In a possible embodiment, the network device may implicitly indicate the first PUCCH resource by using first indication information in the indication information, and explicitly indicate the quantity N of repeated transmissions by using second indication information. For example, the network device may indicate the first PUCCH resource by using PUCCH resource indication information (PUCCH resource indicator, PRI) or a semi-persistent indication parameter in the DCI. For example, with reference to Table 1, a bit of the PRI is "1", and "1" is used to indicate the PUCCH resource 1 in the row corresponding to the index value 1 in Table 1.

Optionally, the second indication information may be carried in existing configuration information. For example, the terminal device further receives a configuration message from higher layer RRC signaling, and the configuration message indicates the quantity of repeated transmissions. The terminal device may further receive third indication information from the network device. The third indication information is used to enable a parameter, namely, the quantity of repeated transmissions, that is indicated by the second indication information. After the parameter, namely, the quantity of repeated transmissions, is enabled, the quantity of repeated transmissions indicates a quantity of repeated transmissions of a PUCCH resource that can be supported in one time unit. The time unit may be a slot, or may be a sub-slot.

In another possible embodiment, the network device may explicitly indicate the first PUCCH resource and the quantity N of repeated transmissions in the indication information. For example, a format of the DCI sent by the network device to the terminal device may be a DCI format 1 (or a DCI format 1). The DCI format 1 may include the following information fields, as shown in Table 4.

TABLE 4

| Information field | Quantity of bits |
| --- | --- |
| Short Messages Indicator (SMS message indicator) | 2 bits |
| Short Messages (SMS message) | 8 bits (reserved bits) |
| Frequency domain resource assignment (frequency domain resource indicator) | T bits |

TABLE 4-continued

| Information field | Quantity of bits |
| --- | --- |
| Time domain resource assignment (time domain resource indicator) | 4 bits |
| VRB-to-PRB mapping (VRB-to-PRB mapping) | 1 bit |
| MCS (modulation and coding scheme) | 5 bits |
| TB scaling (TB scaling) | 2 bits |
| Reserved bits (reserved bits) | 6 bits |

In Table 4, "Frequency domain resource assignment (frequency domain resource indicator)" and/or "Time domain resource assignment (time domain resource indicator)" in the DCI format 1 may indicate the first PUCCH resource, and one bit in "Reserved bits (reserved bits)" in the DCI format 1 may be used to indicate the quantity N of repeated transmissions.

Step 503: The terminal device receives the indication information from the network device.

Specifically, the terminal device may receive signaling from the network device, where the signaling includes the indication information. For example, the terminal device receives the DCI, where the DCI includes the indication information.

Step 504: The terminal device determines the first PUCCH resource and the quantity N of repeated transmissions in the at least one PUCCH resource set based on the indication information.

In this embodiment of this application, there may be a plurality of implementations in which the terminal device determines the first PUCCH resource and the quantity N of repeated transmissions based on the indication information. The following describes several possible implementations by using examples.

Case 1: It is assumed that the network device configures only one PUCCH resource set for the terminal device, and the network device configures a quantity of repeated transmissions for a PUCCH resource (or a PUCCH resource set) in the PUCCH resource set according to the method provided in Embodiment 1. In this case, the terminal device may determine the first PUCCH resource and the quantity N of repeated transmissions in Manner 1 or Manner 2 below.

Manner 1: If the network device implicitly indicates the first PUCCH resource and the quantity N of repeated transmissions in the indication information, the terminal device may determine, in the PUCCH resource set, the PUCCH resource and the quantity of repeated transmissions that correspond to the indication information.

Figure 6A:
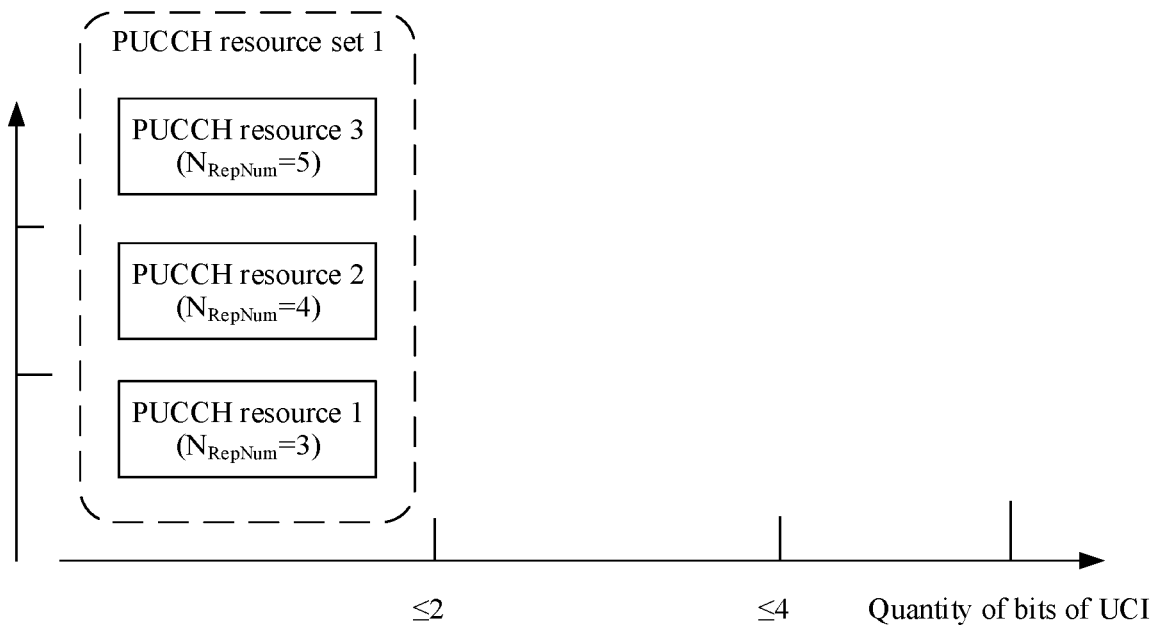
FIG. 6A to FIG. 6E are schematic diagrams of application scenarios of a communication method according to an embodiment of this application.

For example, refer to FIG. 6A. Assuming that the indication information is a PRI in the DCI, and the PRI is "1", the terminal device may determine, in Table 1 corresponding to a PUCCH resource set 1, the PUCCH resource 1 and the quantity 3 of repeated transmissions that correspond to the index value "1".

Manner 2: If the network device explicitly indicates the first PUCCH resource and the quantity N of repeated transmissions in the indication information, or the network device implicitly indicates the first PUCCH resource and explicitly indicates the quantity N of repeated transmissions in the indication information, the terminal device may determine, in the PUCCH resource set, the PUCCH resource and the quantity of repeated transmissions that correspond to the indication information.

For example, refer to FIG. 6A. Assuming that the indication information is that "Frequency domain resource assignment (frequency domain resource indicator)" and "Time domain resource assignment (time domain resource indicator)" in the DCI indicate that a resource used to carry the UCI is a PUCCH resource 1, and one of the reserved bits indicates that a quantity of repeated transmissions is 3, the terminal device may determine the PUCCH resource 1 and the quantity 3 of repeated transmissions in Table 1 corresponding to a PUCCH resource set 1.

For example, refer to FIG. 6A. Assuming that the indication information is a PRI in the DCI, and the PRI is "1", the terminal device may determine, in the PUCCH resource set 1, the PUCCH resource 1 corresponding to the index value "1", and then determine the PUCCH resource 1 and the quantity 3 of repeated transmissions based on the explicitly indicated quantity 3 of repeated transmissions.

Manner 3: If the network device implicitly indicates the first PUCCH resource in the first indication information in the indication information, and explicitly indicates the quantity N of repeated transmissions in the second indication information, the terminal device may determine, in the PUCCH resource set, the PUCCH resource and the quantity of repeated transmissions that correspond to the indication information.

For example, refer to FIG. 6A. Assuming that the indication information is a PRI in the DCI, and the PRI is "1", the terminal device may determine, in Table 1 corresponding to a PUCCH resource set 1, the PUCCH resource 1 corresponding to the index value "1", and one of the reserved bits indicates that the quantity of repeated transmissions is 3.

Case 2: It is assumed that the network device configures at least two PUCCH resource sets for the terminal device, and the network device configures a quantity of repeated transmissions for a PUCCH resource (or a PUCCH resource set) in the PUCCH resource sets according to the method provided in Embodiment 1. In this case, the terminal device may determine the first PUCCH resource and the quantity N of repeated transmissions in any one of Manner 4 to Manner 8 below.

Manner 4: If the network device implicitly indicates the first PUCCH resource and the quantity N of repeated transmissions in the indication information, the terminal device may first determine, based on a quantity of bits of the to-be-sent UCI, a target PUCCH resource set in the at least two PUCCH resource sets corresponding to the terminal device, and then the terminal device determines the first PUCCH resource and the quantity N of repeated transmissions in the target PUCCH resource set based on the indication information in Manner 1.

Figure 6B:
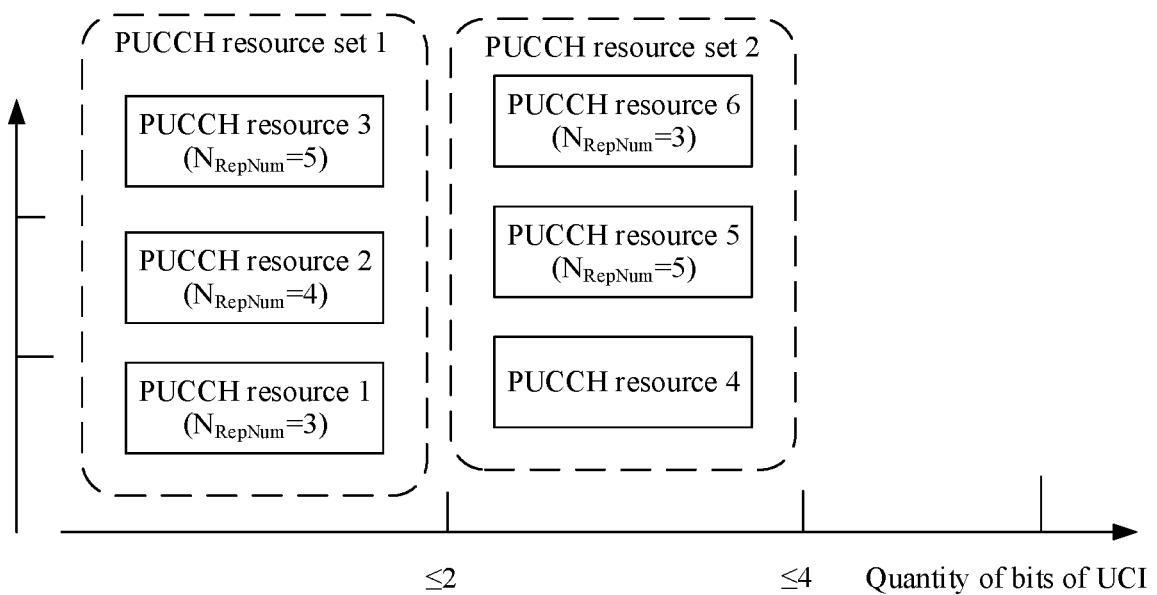

For example, refer to FIG. 6B. If the terminal device determines that the quantity of bits of the to-be-sent UCI is 2, the terminal device determines that a PUCCH resource set 1 falling within a range [0, 2] of the quantity of bits of the UCI is the target PUCCH resource set. Assuming that the indication information is a PRI in the DCI, and the PRI is "1", the terminal device may determine, in Table 1 corresponding to the PUCCH resource set 1, the PUCCH resource 1 and the quantity 3 of repeated transmissions that correspond to the index value "1".

For another example, if the terminal device determines that the quantity of bits of the to-be-sent UCI is 3, the terminal device determines that a PUCCH resource set 2 falling within a range [2, 4] of the quantity of bits of the UCI is the target PUCCH resource set. Assuming that the indication information is a PRI in the DCI, and the PRI is "1", the terminal device may determine, in Table 1a corresponding to the PUCCH resource set 2, a PUCCH resource 4 corresponding to the index value "1", and the quantity of repeated transmissions may be a default value (e.g., the default value is 3).

Manner 5: If the network device explicitly indicates the first PUCCH resource and the quantity N of repeated transmissions in the indication information, or the network device implicitly indicates the first PUCCH resource and explicitly indicates the quantity N of repeated transmissions in the indication information, the terminal device may first determine, based on a quantity of bits of the to-be-sent UCI, a target PUCCH resource set in the at least two PUCCH resource sets corresponding to the terminal device, and then the terminal device determines the first PUCCH resource and the quantity N of repeated transmissions in the target PUCCH resource set based on the indication information in Manner 2.

For example, refer to FIG. 6B. If the terminal device determines that the quantity of bits of the to-be-sent UCI is 2, the terminal device determines that a PUCCH resource set 1 falling within a range [0, 2] of the quantity of bits of the UCI is the target PUCCH resource set. Assuming that the indication information is that "Frequency domain resource assignment (frequency domain resource indicator)" and "Time domain resource assignment (time domain resource indicator)" in the DCI indicate that a resource used to carry the UCI is a PUCCH resource 1, and a quantity of repeated transmissions is 3, the terminal device may determine the PUCCH resource 1 and the quantity 3 of repeated transmissions in Table 1 corresponding to the PUCCH resource set 1.

Manner 6: If the network device explicitly indicates the first PUCCH resource and the quantity N of repeated transmissions in the indication information, or the network device implicitly indicates the first PUCCH resource and explicitly indicates the quantity N of repeated transmissions in the indication information, the terminal device may first determine, based on the quantity N of repeated transmissions, a target PUCCH resource set in the at least two PUCCH resource sets corresponding to the terminal device, and then the terminal device determines the first PUCCH resource and the quantity N of repeated transmissions in the target PUCCH resource set based on the indication information in Manner 2.

Figure 6C:
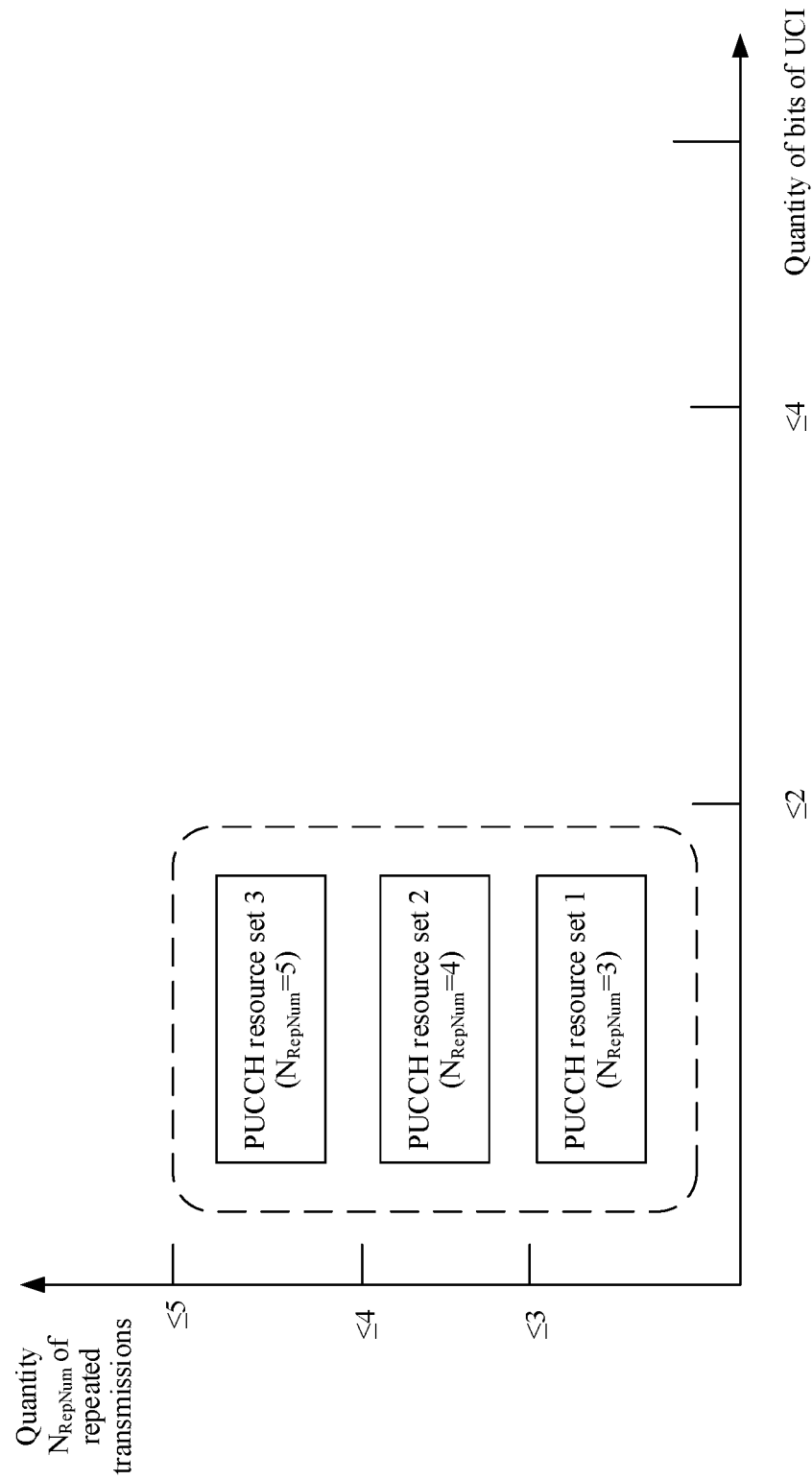

For example, refer to FIG. 6C. If the terminal device determines that the quantity N of repeated transmissions indicated by the second indication information is 3, the terminal device determines that a PUCCH resource set 1 falling within a range [0, 3] of the quantity of repeated transmissions is the target PUCCH resource set. Assuming that the indication information is that "Frequency domain resource assignment (frequency domain resource indicator)" and "Time domain resource assignment (time domain resource indicator)" in the DCI indicate that a resource used to carry the UCI is a PUCCH resource 1, and a quantity of repeated transmissions is 3, the terminal device may determine the PUCCH resource 1 and the quantity 3 of repeated transmissions in Table 2 corresponding to the PUCCH resource set 1.

For example, refer to FIG. 6C. If the terminal device determines that the quantity N of repeated transmissions indicated by the second indication information is 3, the terminal device determines that a PUCCH resource set 1 falling within a range [0, 3] of the quantity of repeated transmissions is the target PUCCH resource set. Assuming that the indication information is a PRI in the DCI, and the PRI is "1", the terminal device may determine, in Table 2 corresponding to the PUCCH resource set 1, the PUCCH resource 1 and the quantity 3 of repeated transmissions that correspond to the index value "1".

Manner 7: If the network device explicitly indicates the first PUCCH resource and the quantity N of repeated transmissions in the indication information, or the network device implicitly indicates the first PUCCH resource and explicitly indicates the quantity N of repeated transmissions in the indication information, the terminal device may first determine, based on the quantity N of repeated transmissions and a quantity of bits of the to-be-sent UCI, a target PUCCH resource set in the at least two PUCCH resource sets corresponding to the terminal device, and then the terminal device determines the first PUCCH resource and the quantity N of repeated transmissions in the target PUCCH resource set based on the indication information in Manner 2.

Figure 6D:
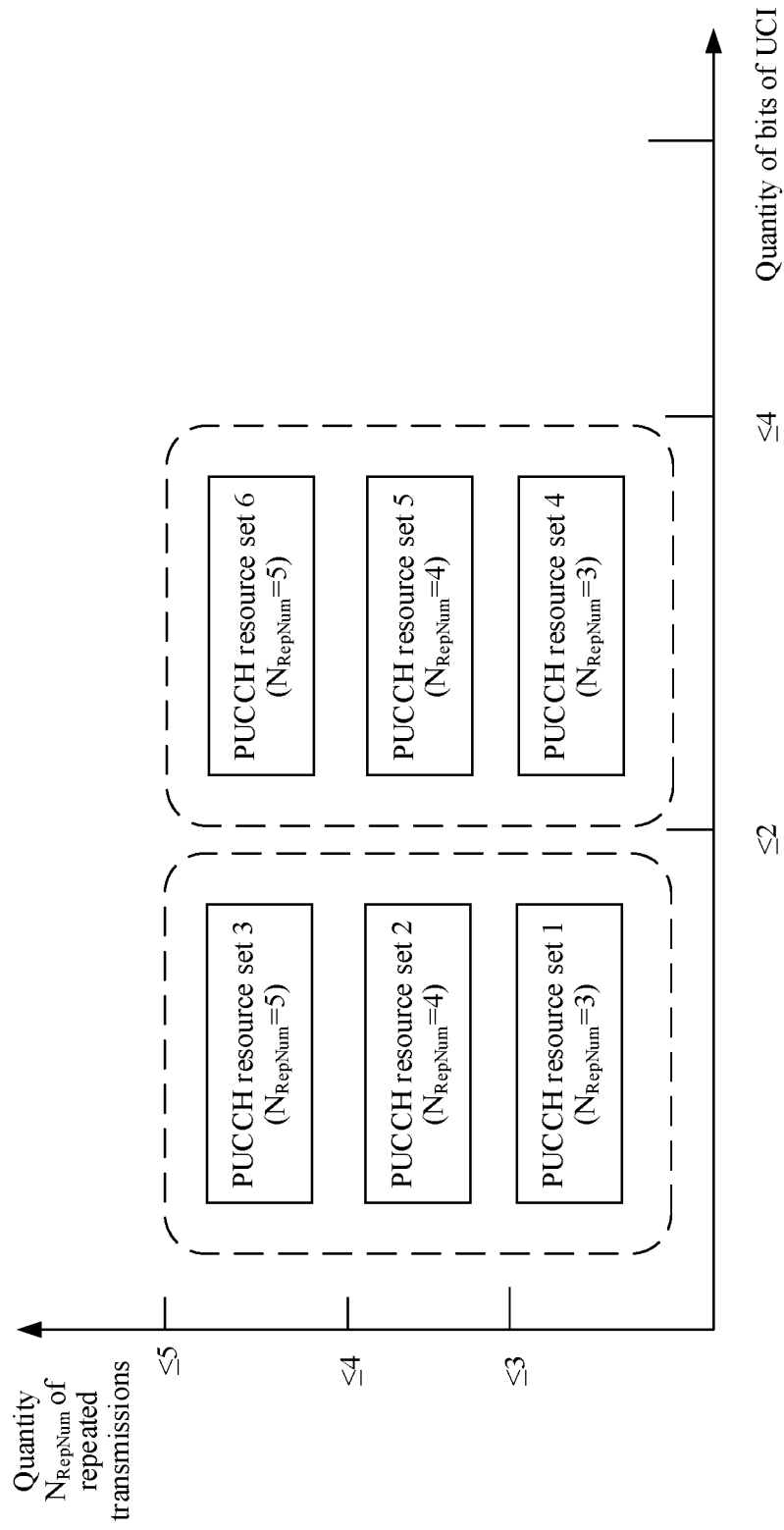

For example, refer to FIG. 6D. If the terminal device determines that the quantity of bits of the to-be-sent UCI is 2, the terminal device determines that a PUCCH resource set 1, a PUCCH resource set 2, and a PUCCH resource set 3 falling within a range [0, 2] of the quantity of bits of the UCI are candidate target PUCCH resource sets. Further, if the terminal device determines that the quantity N of repeated transmissions indicated by the second indication information is 3, the terminal device determines that the PUCCH resource set 1 corresponding to the quantity 3 of repeated transmissions is the target PUCCH resource set. Assuming that the indication information is that "Frequency domain resource assignment (frequency domain resource indicator)" and "Time domain resource assignment (time domain resource indicator)" in the DCI indicate that a resource used to carry the UCI is a PUCCH resource 1, and a quantity of repeated transmissions is 3, the terminal device may determine the PUCCH resource 1 and the quantity 3 of repeated transmissions in Table 2 corresponding to the PUCCH resource set 1.

For example, refer to FIG. 6D. If the terminal device determines that the quantity of bits of the to-be-sent UCI is 2, the terminal device determines that a PUCCH resource set 1, a PUCCH resource set 2, and a PUCCH resource set 3 falling within a range [0, 2] of the quantity of bits of the UCI are candidate target PUCCH resource sets. Further, if the terminal device determines that the quantity N of repeated transmissions indicated by the second indication information is 3, the terminal device determines that the PUCCH resource set 1 corresponding to the quantity 3 of repeated transmissions is the target PUCCH resource set. Assuming that the indication information is a PRI in the DCI, the PRI is "1" and indicates that a resource used to carry the UCI is a PUCCH resource 1, and a quantity of repeated transmissions is 3, the terminal device may determine the PUCCH resource 1 and the quantity 3 of repeated transmissions in Table 2 corresponding to the PUCCH resource set 1. For example, refer to FIG. 6E. If the terminal device determines that the quantity of bits of the to-be-sent UCI is 2, the terminal device determines that a PUCCH resource set 1, a PUCCH resource set 2, and a PUCCH resource set 3 falling within a range [0, 2] of the quantity of bits of the UCI are candidate target PUCCH resource sets. Further, if the terminal device determines that the quantity N of repeated transmissions indicated by the second indication information is 3, the terminal device determines that the PUCCH resource set 1 falling within a range [0, 3] of the quantity of repeated transmissions is the target PUCCH resource set. Assuming that the indication information is that "Frequency domain resource assignment (frequency domain resource indicator)" and "Time domain resource assignment (time domain resource indicator)" in the DCI indicate that a resource used to carry the UCI is a PUCCH resource 1, and a quantity of repeated transmissions is 3, the terminal device may determine the PUCCH resource 1 and the quantity 3 of repeated transmissions in Table 3a corresponding to the PUCCH resource set 2.

Manner 8: If the network device explicitly indicates the first PUCCH resource and the quantity N of repeated transmissions in the indication information, or the network device implicitly indicates the first PUCCH resource and explicitly indicates the quantity N of repeated transmissions in the indication information, the terminal device may first determine, based on the quantity N of repeated transmissions and a quantity of bits of the to-be-sent UCI, a target PUCCH resource set in the at least two PUCCH resource sets corresponding to the terminal device, and then the terminal device determines the first PUCCH resource and the quantity N of repeated transmissions in the target PUCCH resource set based on the indication information in Manner 1.

Figure 6E:
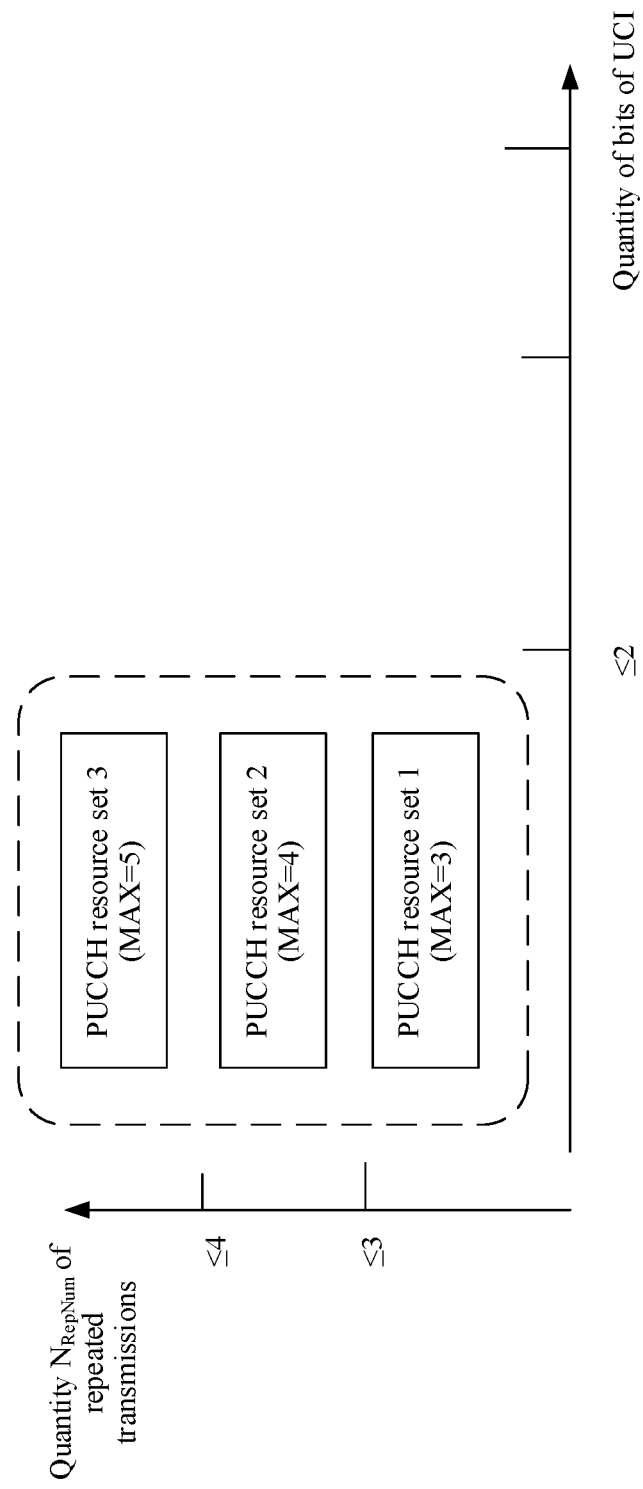

For example, refer to FIG. 6E. If the terminal device determines that the quantity of bits of the to-be-sent UCI is 2, the terminal device determines that a PUCCH resource set 1, a PUCCH resource set 2, and a PUCCH resource set 3 falling within a range [0, 2] of the quantity of bits of the UCI are candidate target PUCCH resource sets. Further, if the terminal device determines that the quantity N of repeated transmissions indicated by the second indication information is 3, the terminal device determines that the PUCCH resource set 1 falling within a range [0, 3] of the quantity of repeated transmissions is the target PUCCH resource set. Assuming that the indication information is a PRI in the DCI, and the PRI is "1", the terminal device may determine, in Table 1a corresponding to the PUCCH resource set 1, the PUCCH resource 4 corresponding to the index value "1", and the quantity of repeated transmissions may be a default value (e.g., the default value is 3).

Step 505: The terminal device repeatedly sends the UCI to the network device for M times by using the first PUCCH resource and the quantity N of repeated transmissions.

Specifically, the terminal device determines, by using the first PUCCH resource and the quantity N of repeated transmissions, N PUCCH resources used for the M times of repeated sending of the UCI. In addition, the terminal device determines M by using the N PUCCH resources, where the first PUCCH resource is one of the N PUCCH resources. The terminal device repeatedly transmits the UCI for M times by using the N PUCCH resources.

Step 506: The network device repeatedly receives the UCI for M times by using the first PUCCH resource and the quantity N of repeated transmissions.

Specifically, the network device determines, by using the first PUCCH resource and the quantity N of repeated transmissions, N PUCCH resources used for the M times of repeated receiving of the UCI. In addition, the network device determines M by using the N PUCCH resources, where the first PUCCH resource is one of the N PUCCH resources. The network device repeatedly receives the UCI for M times by using the N PUCCH resources, where one PUCCH resource carries one piece of UCI.

In step 505 and step 506, the terminal device and the network device may determine M by using the N PUCCH resources in the following manners.

Manner I: The quantity M of transmissions of the UCI is determined based on a quantity of PUCCH resources that cross a slot boundary and that are in the N PUCCH resources.

If there are H PUCCH resources in the N PUCCH resources crossing the slot boundary, M=N+H. For example, as shown in FIG. 7C, the terminal device determines that the quantity N of repeated transmissions is 3, the first PUCCH resource is a PUCCH 1 in a slot 1, and the PUCCH 1 occupies a symbol 9, a symbol 10, and a symbol 11 in the slot 1. The terminal device determines that a PUCCH 2 is a resource corresponding to a symbol 12 and a symbol 13 in the slot 1 and a symbol 0 in a slot 2. The terminal device determines that a PUCCH 3 is a resource corresponding to a symbol 1, a symbol 2, and a symbol 3 in the slot 2. The terminal device separately sends the UCI once on the PUCCH 1, the PUCCH 2, and the PUCCH 3. There is one PUCCH 2 crossing the slot boundary (that is, H=1). That is, the PUCCH 2 occupies the symbol 12 and the symbol 13 in the slot 1 and the symbol 0 in the slot 2. For the PUCCH 2 crossing the slot boundary, it means that two transmissions are performed. The first transmission is performed on the symbol 12 and the symbol 12 in the slot 1, and the second transmission is performed on the symbol 0 in the slot 2. Therefore, M is equal to N+H=3+1=4.

Manner II: The quantity M of transmissions of the UCI is determined based on a quantity of second PUCCH resources in the N PUCCH resources, where the second PUCCH resource includes a downlink symbol, a sending conversion symbol, a predefined symbol, or a slot boundary.

If there are R second PUCCH resources in the N PUCCH resources, M=N—R, where R is less than N. The second PUCCH resource includes the downlink symbol, the sending conversion symbol, the predefined symbol, or the slot boundary. The sending conversion symbol may be a downlink-to-uplink conversion symbol in TDD. For example, as shown in FIG. 7G, a slot 1 is an uplink slot, a symbol 0 in a slot 2 is a downlink symbol, and remaining symbols are uplink symbols. The terminal device determines that the quantity N of repeated transmissions is 3, the first PUCCH resource is a PUCCH 1 in the slot 1, and the PUCCH 1 occupies a symbol 9, a symbol 10, and a symbol 11 in the slot 1. The terminal device determines that a PUCCH 2 is a resource corresponding to the symbol 0, a symbol 1, and a symbol 2 in the slot 2. The terminal device determines that a PUCCH 3 is a resource corresponding to a symbol 3, a symbol 4, and a symbol 5 in the slot 2. Because the symbol 0 in the slot 2 is the downlink symbol, the corresponding PUCCH 2 is not transmitted. That is, only the PUCCH 1 and the PUCCH 3 are transmitted. Therefore, M is equal to 2.

Manner III: The quantity M of transmissions of the UCI is determined based on a quantity of PUCCH resources crossing a slot boundary and a quantity of second PUCCH resources in the N PUCCH resources, where the second PUCCH resource includes a downlink symbol, a sending conversion symbol, a predefined symbol, or the slot boundary.

If none of the N PUCCH resources crosses the slot boundary, and none of the PUCCH resources is any one of the downlink symbol, the sending conversion symbol, or the predefined symbol, M is equal to N.

Figure 7A:
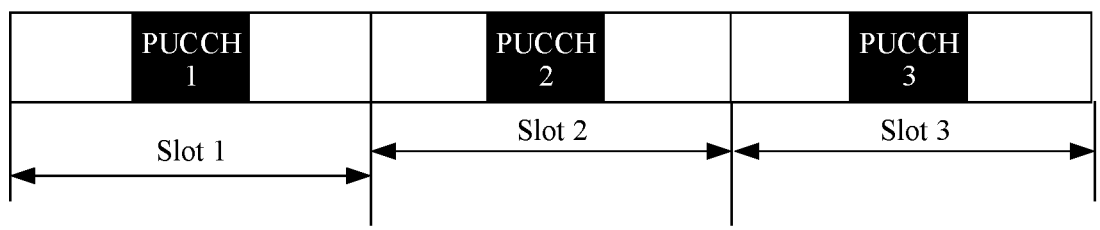
FIG. 7A to FIG. 7G are schematic diagrams of time domain positions of PUCCH resources according to an embodiment of this application.

For example, as shown in FIG. 7A, the terminal device determines that the quantity N of repeated transmissions is 3, and the first PUCCH resource is a PUCCH 1 in a slot 1. It is assumed that the PUCCH 1 occupies a symbol 3, a symbol 4, and a symbol 5 in the slot 1. The terminal device determines that a PUCCH 2 is a resource corresponding to a symbol 3, a symbol 4, and a symbol 5 in a slot 2. The terminal device determines that a PUCCH 3 is a resource corresponding to a symbol 3, a symbol 4, and a symbol 5 in a slot 2. The terminal device separately sends the UCI once on the PUCCH 1, the PUCCH 2, and the PUCCH 3. In this scenario, none of the PUCCH resources crosses the slot boundary. Therefore, M is equal to N. For example, M and N are both 3.

Figure 7B:
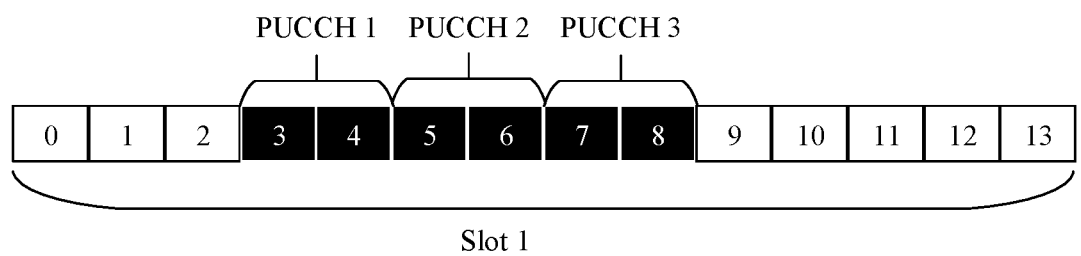
Figure 7C:
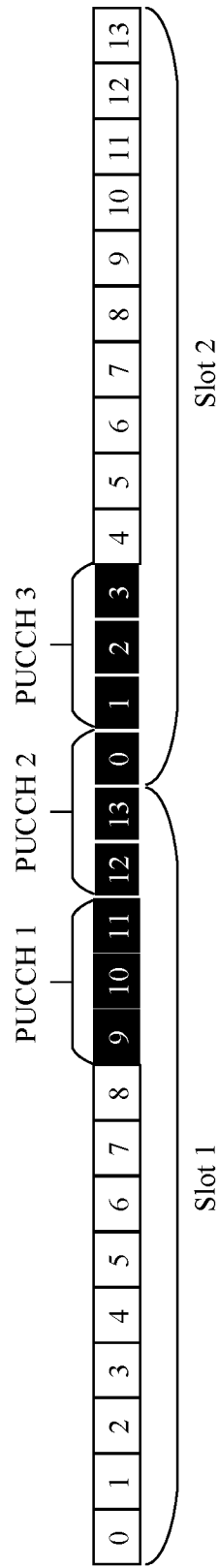

For example, as shown in FIG. 7B, the terminal device determines that the quantity N of repeated transmissions is 3, the first PUCCH resource is a PUCCH 1 in a slot 1, and the PUCCH 1 occupies a symbol 3 and a symbol 4 in the slot 1. The terminal device determines that a PUCCH 2 is a resource corresponding to a symbol 5 and a symbol 6 in the slot 1. The terminal device determines that a PUCCH 3 is a resource corresponding to a symbol 7 and a symbol 8 in the slot 1. The terminal device separately sends the UCI once on the PUCCH 1, the PUCCH 2, and the PUCCH 3. In another possible implementation, an interval between the PUCCH 3 and the PUCCH 2 may alternatively be T symbols, where T is a predefined value; or the PUCCH 3 is a resource in an adjacent slot. This is not limited in this application. In this scenario, none of the PUCCH resources crosses the slot boundary. Therefore, M is equal to N. For example, M and N are both 3.

It should be noted that currently, a PUCCH resource may have the following five PUCCH formats, as shown in Table 5.

TABLE 5

| PUCCH format (format) | Length of occupied OFDM symbols (length in OFDM symbols) | Quantity of bits of uplink control information |
| --- | --- | --- |
| 0 | 1 and 2 | ≤2 |
| 1 | 4 to 14 | ≤2 |
| 2 | 1 and 2 | >2 |
| 3 | 4 to 14 | >2 |
| 4 | 4 to 14 | >2 |

The PUCCH format 0 and the PUCCH format 2 are also referred to as short PUCCH formats. The foregoing uplink control information transmission in this embodiment of this application is applicable to transmission in the PUCCH format 0 and the PUCCH format 2.

In this embodiment of this application, in step 505 and step 506, there may be a plurality of implementations in which the terminal device and the network device determine, by using the first PUCCH resource and the quantity N of repeated transmissions, the N PUCCH resources used for the M times of repeated transmitting of the UCI. The following describes several possible implementations by using examples.

Manner 1: The terminal device determines that PUCCH resources in N consecutive or incompletely consecutive uplink slots are used to send the UCI, or the network device determines that PUCCH resources in N consecutive or incompletely consecutive uplink slots are used to receive the UCI.

For example, as shown in FIG. 7A, the terminal device determines that the quantity N of repeated transmissions is 3, and the first PUCCH resource is a PUCCH 1 in a slot 1. It is assumed that the PUCCH 1 occupies a symbol 3, a symbol 4, and a symbol 5 in the slot 1. The terminal device determines that a PUCCH 2 is a resource corresponding to a symbol 3, a symbol 4, and a symbol 5 in a slot 2. The terminal device determines that a PUCCH 3 is a resource corresponding to a symbol 3, a symbol 4, and a symbol 5 in a slot 2. The terminal device separately sends the UCI once on the PUCCH 1, the PUCCH 2, and the PUCCH 3. It can be learned that the PUCCH 1, the PUCCH 2, and the PUCCH 3 are PUCCH resources in three consecutive uplink slots.

Manner 2: The terminal device or the network device determines that PUCCH resources used for S times of repeated transmitting of the UCI in the M times of repeated transmitting of the UCI occupy one slot, a quantity of interval symbols of the PUCCH resources used for the S times of repeated transmitting of the UCI in a same slot is predefined, and S is greater than or equal to 2 and is less than or equal to M.

In other words, the terminal device or the network device determines that at least two of the N PUCCH resources occupy one slot, and symbols occupied by the at least two PUCCH resources in a same slot are consecutive. Alternatively, the terminal device or the network device determines that at least two of the N PUCCH resources occupy one slot, and a quantity of interval symbols of the at least two PUCCH resources in a same slot is predefined. A PUCCH resource used for each of the M times of repeated transmitting of the UCI occupies a same number of symbols in time domain.

For example, as shown in FIG. 7B, the terminal device determines that the quantity N of repeated transmissions is 3, the first PUCCH resource is a PUCCH 1 in a slot 1, and the PUCCH 1 occupies a symbol 3 and a symbol 4 in the slot 1. The terminal device determines that a PUCCH 2 is a resource corresponding to a symbol 5 and a symbol 6 in the slot 1. The terminal device determines that a PUCCH 3 is a resource corresponding to a symbol 7 and a symbol 8 in the slot 1. The terminal device separately sends the UCI once on the PUCCH 1, the PUCCH 2, and the PUCCH 3. In another possible implementation, an interval between the PUCCH 3 and the PUCCH 2 may alternatively be T symbols, where T is a predefined value; or the PUCCH 3 is a resource in an adjacent slot. This is not limited in this application. In this example, the PUCCH 1, the PUCCH 2, and the PUCCH 3 occupy consecutive symbols in a same slot, and each occupies two symbols.

For example, as shown in FIG. 7C, the terminal device determines that the quantity N of repeated transmissions is 3, the first PUCCH resource is a PUCCH 1 in a slot 1, and the PUCCH 1 occupies a symbol 9, a symbol 10, and a symbol 11 in the slot 1. The terminal device determines that a PUCCH 2 is a resource corresponding to a symbol 12 and a symbol 13 in the slot 1 and a symbol 0 in a slot 2. The terminal device determines that a PUCCH 3 is a resource corresponding to a symbol 1, a symbol 2, and a symbol 3 in the slot 2. The terminal device separately sends the UCI once on the PUCCH 1, the PUCCH 2, and the PUCCH 3. In this example, the PUCCH 1 and the PUCCH 2 occupy consecutive symbols in the same slot 1, and the PUCCH 2 and the PUCCH 3 occupy consecutive symbols in the same slot 2.

Figure 7D:
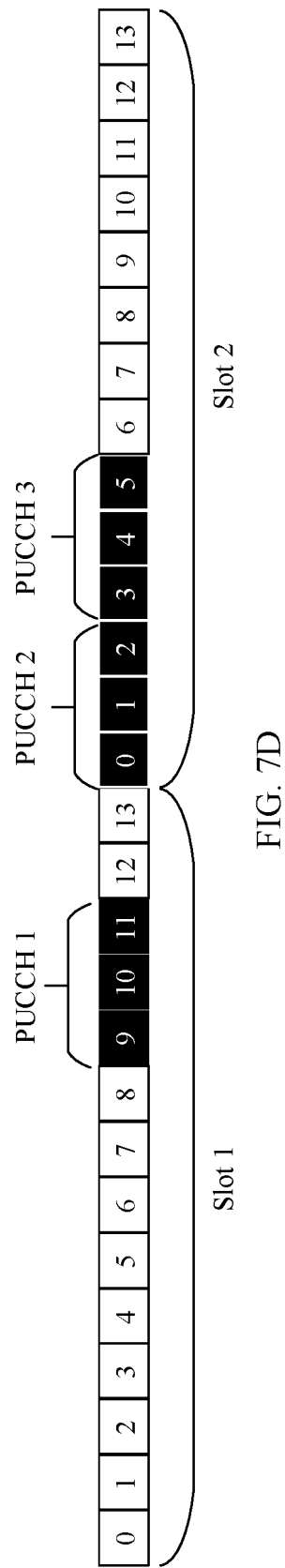

For example, as shown in FIG. 7D, the terminal device determines that the quantity N of repeated transmissions is 3, the first PUCCH resource is a PUCCH 1 in a slot 1, and the PUCCH 1 occupies a symbol 9, a symbol 10, and a symbol 11 in the slot 1. The terminal device determines that a PUCCH 2 is a resource corresponding to a symbol 0, a symbol 1, and a symbol 2 in a slot 2. The terminal device determines that a PUCCH 3 is a resource corresponding to a symbol 3, a symbol 4, and a symbol 5 in the slot 2. The terminal device separately sends the UCI once on the PUCCH 1, the PUCCH 2, and the PUCCH 3. In this example, the PUCCH 2 and the PUCCH 3 occupy consecutive symbols in the same slot 2.

In this embodiment of this application, compared with the method 1, in the method 2, a delay between the N PUCCH resources determined in this embodiment of this application is short, so that a UCI transmission delay can be reduced to some extent, and a delay requirement of a service having a high delay requirement can be met.

For example, one slot is equal to two sub-slots (subslots or minislots). Currently, in a conventional technology, when UCI is repeatedly transmit on N PUCCH resources, it is specified that a PUCCH is repeatedly transmit at a time granularity of slot. Even if a time granularity of a scheduled resource is a sub-slot, in the conventional technology, a PUCCH resource is not allowed to be repeatedly transmit at a granularity of sub-slot either. For example, currently, a time domain offset relationship between the PDSCH and the PUCCH that carries the UCI shown in FIG. 2 is indicated by using a variable k1. k1 indicates that a time domain offset between the PUCCH and the PDSCH is k1 slots. In other words, if the PDSCH is transmitted in an $n^{th}$ slot, the PUCCH corresponding to the PDSCH is transmitted in an $(n+k1)^{th}$ slot.

Figure 7E:
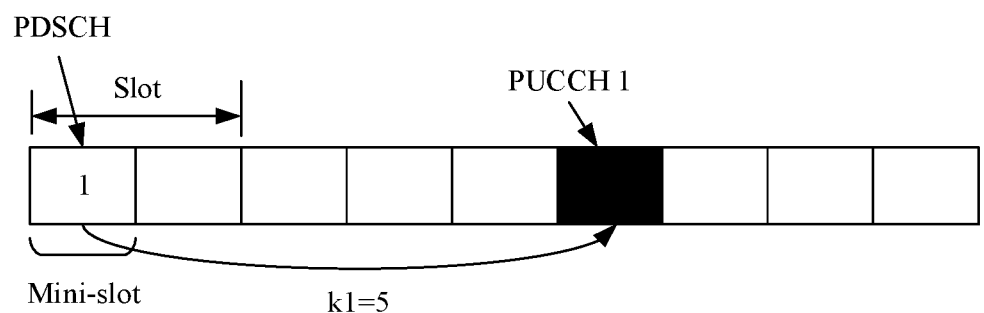

Therefore, improvements are made in this embodiment of this application. When the time granularity of the scheduled resource is a sub-slot, it is agreed in the protocol that k1 indicates that the time domain offset between the PUCCH and the PDSCH is k1 sub-slots (subslots or minislots). In other words, if the PDSCH is transmitted in an $n^{th}$ sub-slot, the PUCCH corresponding to the PDSCH is transmitted in an $(n+k1)^{th}$ sub-slot. For example, as shown in FIG. 7E, one slot corresponds to two sub-slots. Assuming that a time domain offset k1 between a PUCCH and a PDSCH is 5, k1 corresponding to a sub-slot numbered 1 in FIG. 7E is 5, and a position of the PUCCH corresponding to the PDSCH is a position, at an interval of five sub-slots, starting from the PDSCH, namely, a position indicated by an arrow in the figure.

Based on the foregoing improvements, the implementations in which the terminal device and the network device determine the N PUCCH resources may further include Manner 3 below.

Manner 3: The terminal device or the network device determines that time domain resources of the N PUCCH resources are resources in N sub-slots (sub-slots). In other words, the time domain resources used for the M times of repeated transmitting of the UCI are resources in M sub-slots. The N sub-slots may be inconsecutive, or at least two of the N sub-slots may be consecutive, that is, the M sub-slots are at least two consecutive sub-slots.

Figure 7F:
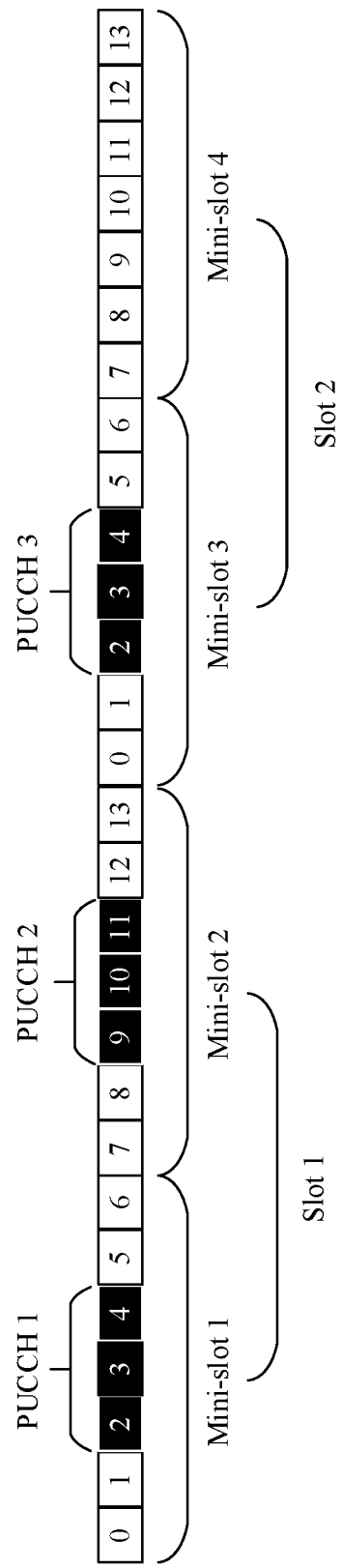
Figure 7G:
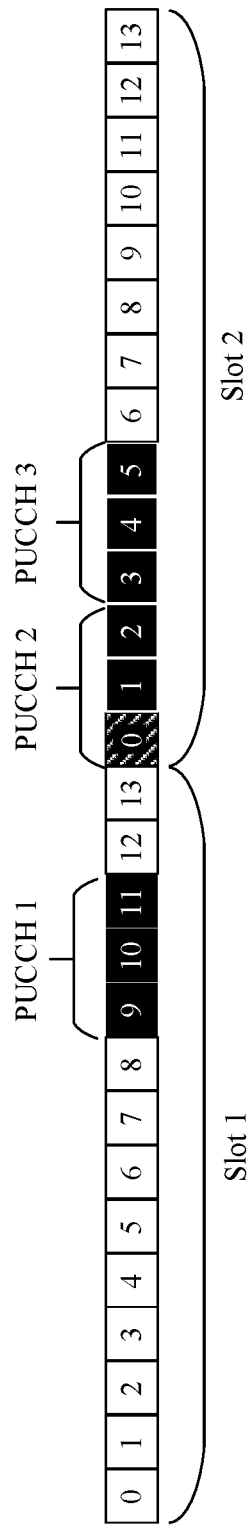

For example, as shown in FIG. 7F, the terminal device determines that the quantity of repeated transmissions is 3, and the first PUCCH resource is a PUCCH 1 corresponding to a symbol 2, a symbol 3, and a symbol 4 in a sub-slot 1. The terminal device determines that a PUCCH 2 is a resource corresponding to a symbol 9, a symbol 10, and a symbol 11 in a sub-slot 2. The terminal device determines that a PUCCH 3 is a resource corresponding to a symbol 2, a symbol 3, and a symbol 4 in a sub-slot 3. The terminal device separately sends the UCI once on the PUCCH 1, the PUCCH 2, and the PUCCH 3. In another possible implementation, an interval between the PUCCH 3 and the PUCCH 2 may alternatively be K symbols, where K is a predefined value, and K is greater than or equal to 1; or the PUCCH 3 is a resource in another adjacent sub-slot. This is not limited in this application.

In this embodiment of this application, compared with the method 1, in the method 3, the N PUCCH resources determined in this embodiment of this application are sub-slots, so that a delay between the PUCCH resources is short, a UCI transmission delay can be reduced to some extent, and a delay requirement of a service having a high delay requirement can be met.

Embodiment 3

Figure 8:
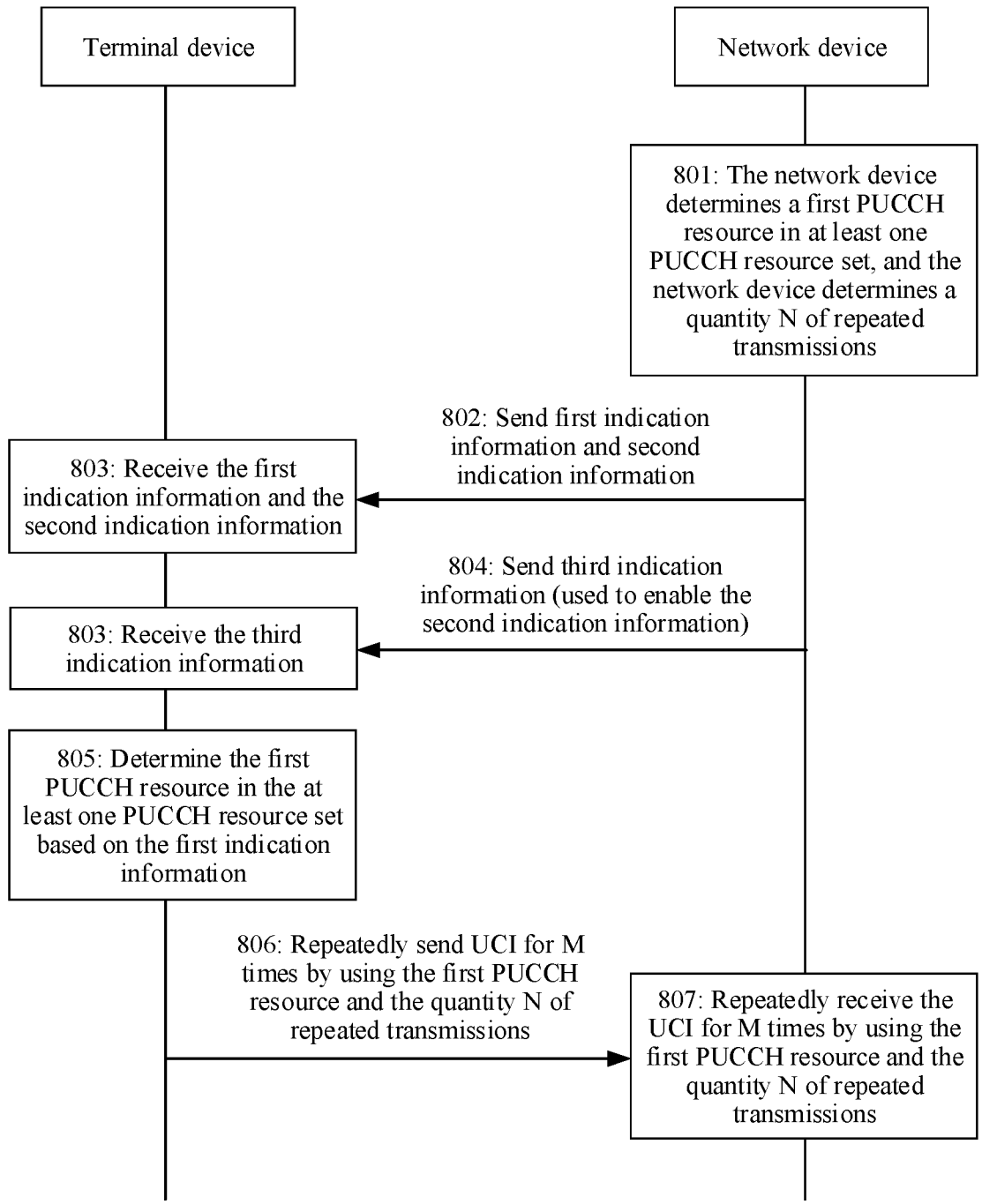
FIG. 8 is a schematic diagram of another uplink control information transmission method according to an embodiment of this application.

FIG. 8 is a schematic flowchart corresponding to an uplink control information transmission method according to Embodiment 3 of this application. As shown in FIG. 8, the method includes the following steps.

Step 801: A network device determines a first PUCCH resource in at least one PUCCH resource set, and the network device determines a quantity N of repeated transmissions.

For content that the PUCCH resource is used to carry, refer to step 501. Details are not described herein again.

Step 802: The network device sends first indication information and second indication information to a terminal device, where the first indication information is used to indicate the first PUCCH resource, and the second indication information is used to indicate the quantity N of repeated transmissions.

The first indication information and the second indication information may be carried in signaling sent by the network device to the terminal device. The signaling in this embodiment of this application may be one or more of radio resource control (RRC) signaling, a media access control (MAC) control element (CE), or physical layer signaling. The physical layer signaling herein may be downlink control information (DCI). Specifically, specific signaling for carrying the indication information may be determined based on a protocol agreement, or based on a protocol agreement and an actual scenario. This is not limited herein.

In consideration of the fact that, in the conventional technology, PUCCHs corresponding to a PUCCH format 1, a PUCCH format 3, and a PUCCH format 4 are allowed to be repeatedly transmit in a plurality of slots, and a parameter, namely, the quantity of repeated transmissions, is configured by using higher layer RRC, in a possible embodiment of this application, the quantity of repeated transmissions is still configured by using the higher layer RRC signaling. When the terminal device receives third indication information from the network device, the third indication information is used to enable the parameter, namely, the quantity of repeated transmissions. In other words, if the terminal device receives the third indication information, the terminal device may repeatedly transmit UCI in the transmission manner described in step 506 in Embodiment 2. In this case, the parameter, namely, the quantity of repeated transmissions, indicates repeated transmissions of a PUCCH resource that can be supported in a time unit. A used PUCCH format is at least one of a PUCCH format 0, the PUCCH format 1, a PUCCH format 2, the PUCCH format 3, and the PUCCH format 4. When the terminal device does not receive the third indication information, or the third indication information received by the terminal device is used to disable the parameter, namely, the quantity of repeated transmissions, the parameter, namely, the quantity of repeated transmissions, is still used to indicate the quantity of repeated transmissions of the PUCCH resource in a plurality of slots. The third indication information may be indicated by using an information field in the DCI. For example, one bit in the reserved bits in Table 4 is used to represent the third indication information. Alternatively, the terminal device may enable or disable the parameter, namely, the quantity of repeated transmissions, by using a higher layer performance semi-persistent configuration.

Step 803: The terminal device receives the first indication information and the second indication information from the network device.

In a possible implementation, the terminal device may receive the higher layer RRC signaling and the DCI from the network device, where the higher layer RRC signaling includes the second indication information, and the DCI includes the first indication information.

Step 804: The terminal device receives the third indication information from the network device. The third indication information is used to enable the parameter, namely, the quantity of repeated transmissions, that is indicated by the second indication information. After the parameter, namely, the quantity of repeated transmissions, is enabled, the parameter, namely, the quantity of repeated transmissions, indicates the repeated transmissions of the PUCCH resource that can be supported in one time unit. The time unit may be a slot, or may be a sub-slot. Specifically, the terminal device may determine, in Manner 1 to Manner 3 after step 506 in Embodiment 2, the PUCCH resource used for repeated transmitting of the UCI.

Step 805: The terminal device determines the first PUCCH resource in the at least one PUCCH resource set based on the first indication information.

In this embodiment of this application, the at least one PUCCH resource set includes information about at least one PUCCH resource, and does not include the parameter, namely, the quantity of repeated transmissions. For example, the terminal device may determine the first PUCCH resource in the at least one PUCCH resource set based on a time-frequency resource position indicated by the first indication information. For another example, the terminal device may determine the first PUCCH resource in the at least one PUCCH resource set based on a PRI.

Step 806: The terminal device repeatedly transmits the same UCI to the network device for M times by using the first PUCCH resource and the quantity N of repeated transmissions.

Specifically, the terminal device determines, by using the first PUCCH resource and the quantity N of repeated transmissions, N PUCCH resources used for the M times of repeated sending of the UCI. In addition, the terminal device determines M by using the N PUCCH resources, where the first PUCCH resource is one of the N PUCCH resources. The terminal device repeatedly sends the UCI for M times by using the N PUCCH resources, where one PUCCH resource carries one piece of UCI.

Step 807: The network device repeatedly receives the UCI for M times by using the first PUCCH resource and the quantity N of repeated transmissions.

Specifically, the network device determines, by using the first PUCCH resource and the quantity N of repeated transmissions, N PUCCH resources used for the M times of repeated receiving of the UCI. In addition, the network device determines M by using the N PUCCH resources, where the first PUCCH resource is one of the N PUCCH resources. The network device repeatedly receives the UCI for M times by using the N PUCCH resources.

In this embodiment of this application, for a manner in which the terminal device and the network device determine M by using the N PUCCH resources, refer to Manner I to Manner III. Details are not described herein again.

In this embodiment of this application, in step 806 and step 807, there may be a plurality of implementations in which the terminal device and the network device determine the N PUCCH resources, and there may be manners corresponding to Manner 1 to Manner 3 listed in step 505 and step 506. For a rule that the N PUCCH resources meet in a slot or a sub-slot, refer to Embodiment 2. Details are not described herein again.

It can be learned that, in this embodiment of this application, when the PUCCH resource can be repeatedly transmitted in one slot according to the foregoing method, a UCI transmission delay can be reduced to some extent, and a delay requirement of a service having a high delay requirement can be met.

Embodiment 4

Figure 9:
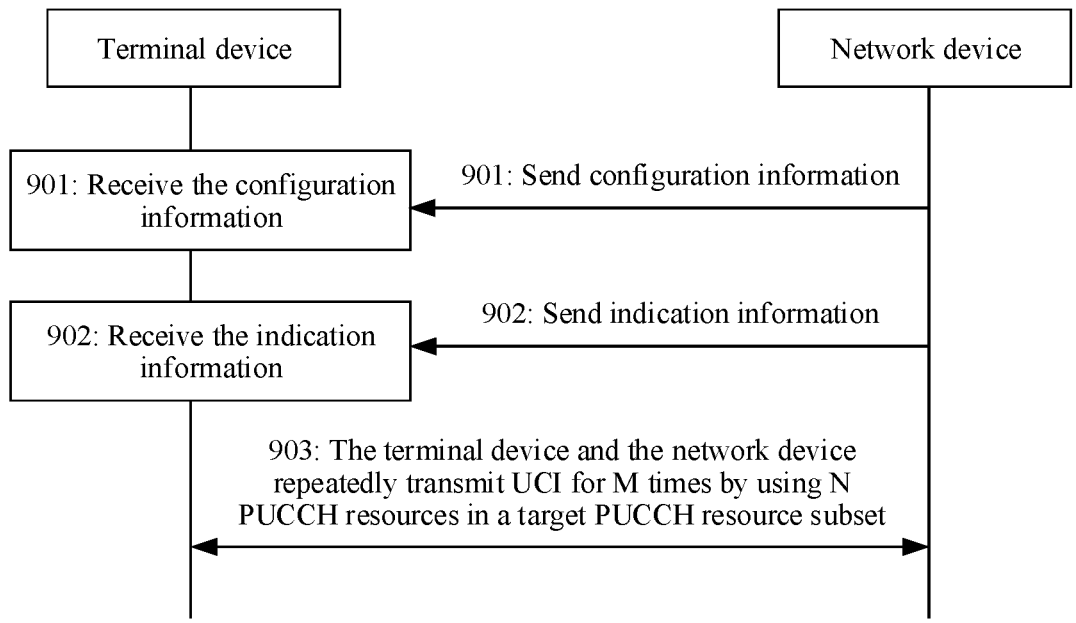
FIG. 9 is a schematic diagram of another uplink control information transmission method according to an embodiment of this application.

FIG. 9 is a schematic flowchart corresponding to an uplink control information transmission method according to an embodiment of this application. The method includes the following steps.

Step 901: A network device sends configuration information, where the configuration information includes at least one physical uplink control channel PUCCH resource set, the PUCCH resource set includes at least one PUCCH resource subset, the at least one PUCCH resource subset includes A PUCCH resources, and A is greater than or equal to 2. Correspondingly, a terminal device receives the configuration information.

The PUCCH resource is used to carry UCI. For related content of the UCI, refer to the foregoing embodiments. Details are not described herein again.

Step 902: The network device sends indication information to the terminal device, where the indication information is used to determine a target PUCCH resource subset in the at least one PUCCH resource set. Correspondingly, the terminal device receives the indication information.

Optionally, the terminal device determines the target PUCCH resource subset in the at least one PUCCH resource set based on the indication information.

Step 903: The network device and the terminal device repeatedly transmit the uplink control information UCI for M times by using N PUCCH resources in the target PUCCH resource subset, where M and N are positive integers.

The indication information in step 902 may be carried in signaling sent by the network device to the terminal device. For signaling-related content in this embodiment of this application, refer to the foregoing embodiments. Details are not described herein again.

In a possible embodiment, the indication information is further used to indicate a quantity Q of repeated transmissions; or fourth indication information is sent, where the fourth indication information is used to indicate the quantity Q of repeated transmissions, and Q is a positive integer. The terminal device determines N×Q PUCCH resources based on the N PUCCH resources and the quantity Q of repeated transmissions, and repeatedly receives the UCI for M times on the N×Q PUCCH resources by using the N×Q PUCCH resources.

For example, the network device indicates the N PUCCH resources by using PUCCH resource indication information (PUCCH resource indicator, PRI) or a semi-persistent indication parameter in DCI. For example, with reference to the following Table 6, the PRI is used to indicate a PUCCH resource 2-1, a PUCCH resource 2-2, and a PUCCH resource 2-3 in a row corresponding to an index value 2 in Table 6. In this embodiment, the PUCCH resource set includes three PUCCH resource subsets, and each PUCCH resource subset corresponds to one row in the table. The PUCCH resources in the row corresponding to the index value 2 are the target PUCCH resource subset. In an example, the target PUCCH resource subset includes the PUCCH resource 2-1, the PUCCH resource 2-2, and the PUCCH resource 2-3.

TABLE 6

| Index value | Identifier of the PUCCH resource | | | |
|---|---|---|---|---|
| 1 | PUCCH resource 1-1 | | | |
| 2 | PUCCH resource 2-1 | PUCCH resource 2-2 | PUCCH resource 2-3 | |
| 3 | PUCCH resource 3-1 | PUCCH resource 3-2 | PUCCH resource 3-3 | PUCCH resource 3-4 |

In another possible embodiment, the network device may explicitly indicate the N PUCCH resources in the indication information. For example, a format of the DCI sent by the network device to the terminal device may be a DCI format 1 (or a DCI format 1). The DCI format 1 may include the following information fields, as shown in Table 4. In Table 4, "Frequency domain resource assignment (frequency domain resource indicator)" and/or "Time domain resource assignment (time domain resource indicator)" in the DCI format 1 may indicate the N PUCCH resources.

Specifically, the terminal device may receive the signaling from the network device, where the signaling includes the indication information. For example, the terminal device receives the DCI, where the DCI includes the indication information.

In this embodiment of this application, there may be a plurality of implementations in which the terminal device determines the N PUCCH resources based on the indication information. The following describes several possible implementations by using examples.

Figure 10A:
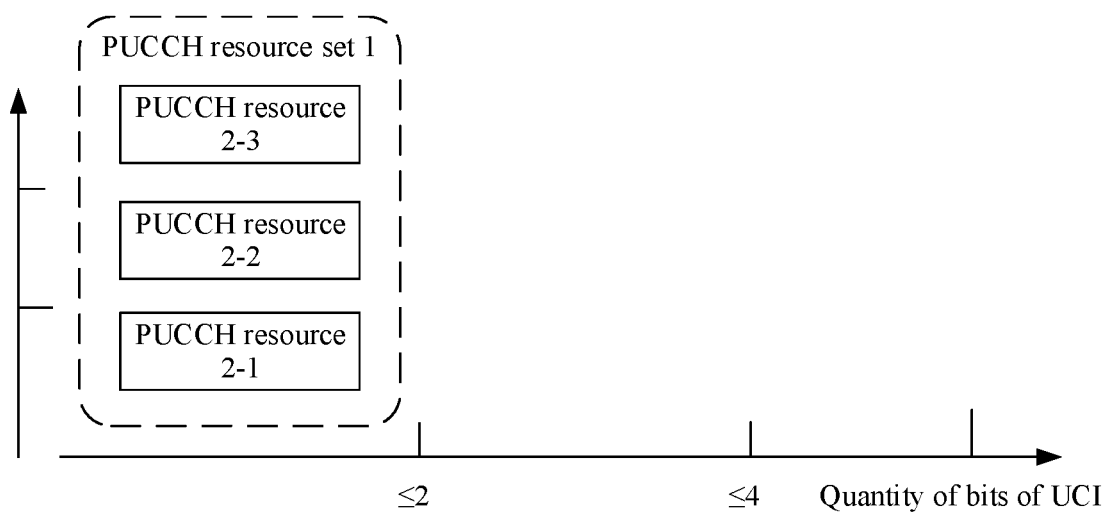
FIG. 10A and FIG. 10B are schematic diagrams of PUCCH resource sets according to an embodiment of this application.

In an example, it is assumed that the network device configures a PUCCH resource set 1 only for the terminal device. Refer to FIG. 10A. Assuming that the indication information is a PRI in the DCI, and the PRI is "2", the terminal device may determine, in the PUCCH resource set 1, the PUCCH resource 2-1, the PUCCH resource 2-2, and the PUCCH resource 2-3 corresponding to the index value "2" in Table 6.

Manner 2: If the network device explicitly indicates the N PUCCH resources in the indication information, the terminal device may determine, in a PUCCH resource set 1, the N PUCCH resources corresponding to the indication information.

For example, refer to FIG. 10A. Assuming that the indication information is that "Frequency domain resource assignment (frequency domain resource indicator)" and "Time domain resource assignment (time domain resource indicator)" in the DCI indicate that resources used to carry the UCI are the PUCCH resource 2-1, the PUCCH resource 2-2, and the PUCCH resource 2-3, the terminal device may determine the PUCCH resource 2-1, the PUCCH resource 2-2, and the PUCCH resource 2-3 in the PUCCH resource set 1.

Case 2: It is assumed that the network device configures at least two PUCCH resource sets for the terminal device. In this case, the terminal device may determine the N PUCCH resources in Manner 4 or Manner 5 below.

In an example, the terminal device determines a target PUCCH resource set in the at least one PUCCH resource set based on a quantity of bits of the UCI, and the indication information received by the terminal device may be used to determine the target PUCCH resource subset in the target PUCCH resource set.

Figure 10B:
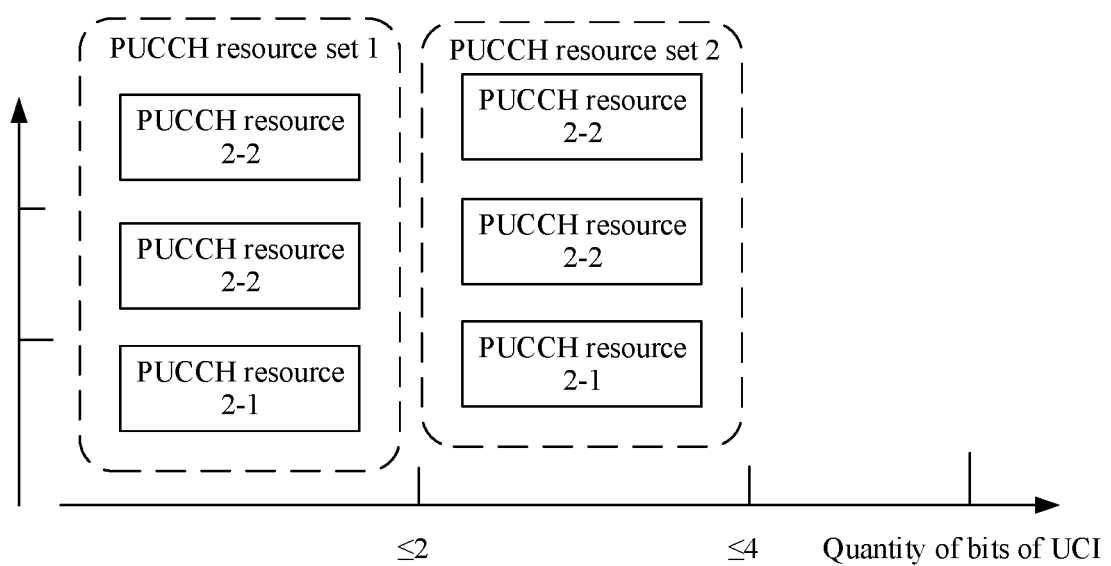

For example, refer to FIG. 10B. If the terminal device determines that the quantity of bits of the to-be-sent UCI is 2, the terminal device determines that a PUCCH resource set 1 falling within a range [0, 2] of the quantity of bits of the UCI is the target PUCCH resource set. Assuming that the indication information is a PRI in the DCI, and the PRI is "2", the terminal device may determine, in the PUCCH resource set 1, the PUCCH resource 2-1, the PUCCH resource 2-2, and the PUCCH resource 2-3 that correspond to the index value "2" and that are determined in Table 6.

For another example, if the terminal device determines that the quantity of bits of the to-be-sent UCI is 3, the terminal device determines that a PUCCH resource set 2 falling within a range [2, 4] of the quantity of bits of the UCI is the target PUCCH resource set. Assuming that the indication information is a PRI in the DCI, and the PRI is "2", the terminal device may determine, in the PUCCH resource set 2, the PUCCH resource 2-1, the PUCCH resource 2-2, and the PUCCH resource 2-3 that correspond to the index value "2" and that are determined in Table 6.

Manner 3: If the network device explicitly indicates the N PUCCH resources in the indication information, the terminal device may first determine, based on a quantity of bits of the to-be-sent UCI, a target PUCCH resource set in the at least two PUCCH resource sets corresponding to the terminal device, and then the terminal device determines the N PUCCH resources in the target PUCCH resource set based on the indication information in Manner 2.

For example, refer to FIG. 10B. If the terminal device determines that the quantity of bits of the to-be-sent UCI is 2, the terminal device determines that a PUCCH resource set 1 falling within a range [0, 2] of the quantity of bits of the UCI is the target PUCCH resource set. Assuming that the indication information is that "Frequency domain resource assignment (frequency domain resource indicator)" and "Time domain resource assignment (time domain resource indicator)" in the DCI indicate that resources used to carry the UCI are the PUCCH resource 2-1 and the PUCCH resource 2-2, the terminal device may determine the PUCCH resource 2-1 and the PUCCH resource 2-2 in the PUCCH resource set 1.

Step 903 specifically includes: The terminal device repeatedly transmits the UCI to the network device for M times by using the N PUCCH resources. Correspondingly, the network device repeatedly receives the UCI for M times by using the N PUCCH resources.

Specifically, the terminal device determines M by using the N PUCCH resources, and the terminal device repeatedly sends the UCI for M times by using the N PUCCH resources. M may be greater than or equal to N, or may be less than N.

For example, PUCCH resources used for S times of repeated transmitting of the UCI in the M times of repeated transmitting of the UCI occupy symbols in one slot, and S is greater than or equal to 2 and is less than or equal to M; or PUCCH resources used for the M times of repeated transmitting of the UCI are in different slots, and time domain positions of at least two of the PUCCH resources used for the M times of repeated transmitting of the UCI are different or partially overlap in the slots.

For determining, by the terminal device and the network device, the resources used for the M repeated transmissions of the UCI, refer to the foregoing embodiments. Details are not described herein again.

In this embodiment of this application, the N PUCCH resources configured by the network device for the terminal device may be resources in a slot, or may be resources in a sub-slot. The N PUCCH resources may be resources that occupy a same symbol length, or may be resources that occupy different symbol lengths. In this embodiment, because the N PUCCH resources are configured by the network device, lengths of the resources may be flexibly configured, so that resource utilization can be improved. In addition, the network device preconfigures the N PUCCH resources, to flexibly configure the quantity of repeated transmissions of the PUCCH resource.

Embodiment 5

When a quantity N of repeated transmissions in Embodiment 1 is set by default, in other words, when a quantity of repeated transmissions corresponding to a resource (or a PUCCH resource set) in the PUCCH resource set may be agreed on in advance in a protocol, a terminal device may complete repeated transmission of UCI based on a first PUCCH resource configured by a network device.

Figure 11:
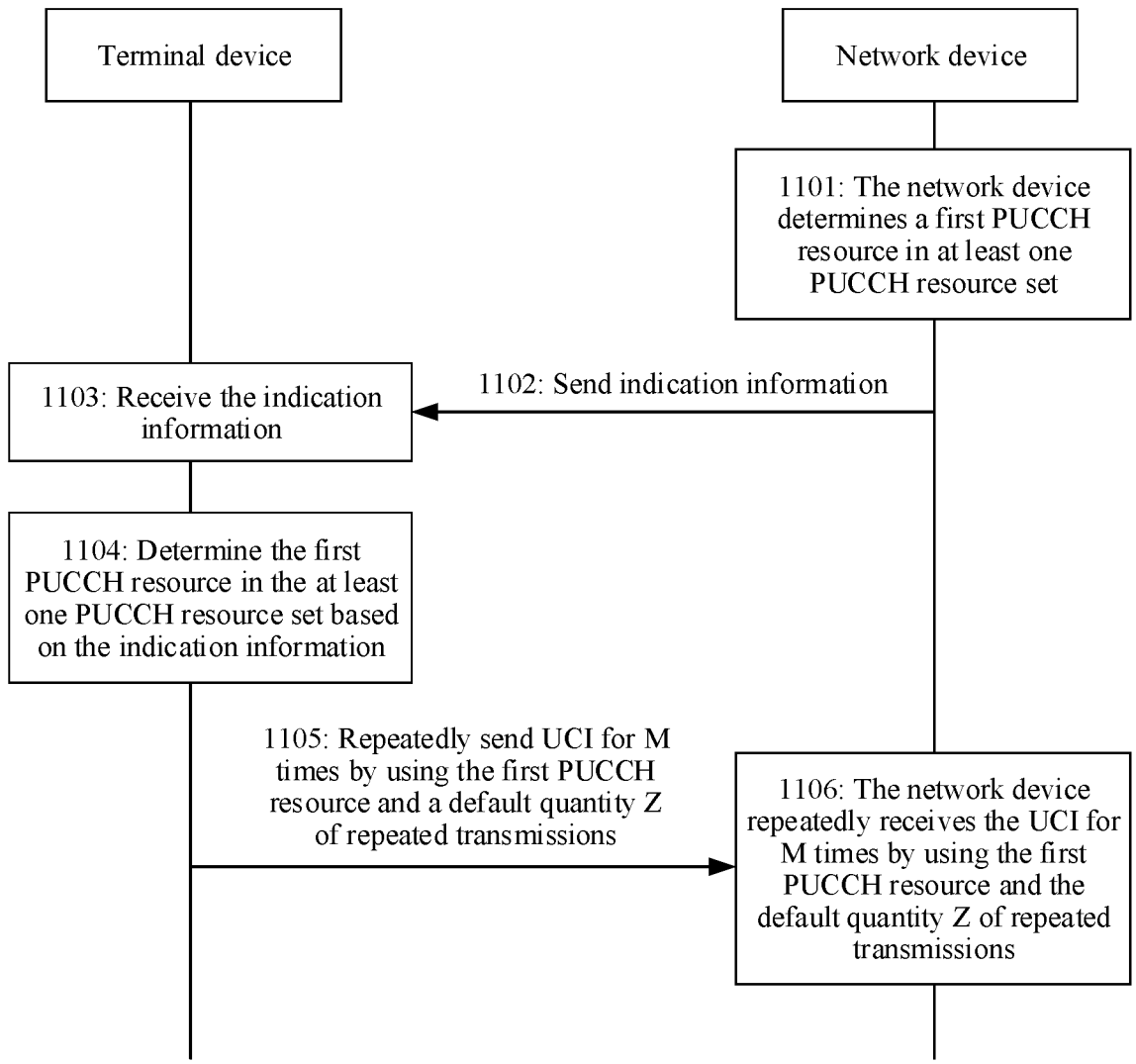
FIG. 11 is a schematic diagram of another uplink control information transmission method according to an embodiment of this application.

FIG. 11 is a schematic flowchart corresponding to an uplink control information transmission method according to Embodiment 5 of this application. As shown in FIG. 11, the method includes the following steps.

Step 1101: A network device determines a first PUCCH resource in at least one PUCCH resource set.

Specifically, the PUCCH resource is used to carry UCI. For descriptions of the UCI, refer to the foregoing embodiments.

Step 1102: The network device sends indication information to a terminal device, where the indication information is used to indicate the first PUCCH resource.

The indication information may be carried in signaling sent by the network device to the terminal device. For descriptions of the signaling in this embodiment of this application, refer to the foregoing embodiments.

An indication manner of the first PUCCH resource may be an explicit indication, or may be an implicit indication. For details, refer to step 1102. Details are not described herein again.

Step 1103: The terminal device receives the indication information from the network device.

Specifically, the terminal device may receive the signaling from the network device, where the signaling includes the indication information. For example, the terminal device receives DCI, where the DCI includes the indication information.

Step 1104: The terminal device determines the first PUCCH resource in the at least one PUCCH resource set based on the indication information.

Step 1105: The terminal device repeatedly transmits the UCI to the network device for M times by using the first PUCCH resource and a default quantity Z of repeated transmissions.

Specifically, the terminal device determines, by using the first PUCCH resource and the default quantity Z of repeated transmissions, Z PUCCH resources used for the M times of repeated transmitting of the UCI. In addition, the terminal device determines M by using the Z PUCCH resources, where the first PUCCH resource is one of the Z PUCCH resources. The terminal device repeatedly transmits the UCI for M times by using the Z PUCCH resources.

Step 1106: The network device repeatedly receives the UCI for M times by using the first PUCCH resource and the default quantity Z of repeated transmissions.

Specifically, the network device determines, by using the first PUCCH resource and the quantity Z of repeated transmissions, Z PUCCH resources used for the M times of repeated receiving of the UCI. In addition, the network device determines M by using the Z PUCCH resources, where the first PUCCH resource is one of the Z PUCCH resources. The network device repeatedly receives the UCI for M times by using the Z PUCCH resources, where one PUCCH resource carries one piece of UCI.

In step 1105 and step 1106, for a manner in which the terminal device and the network device determine M by using the Z PUCCH resources, refer to the foregoing embodiments. Details are not described herein again.

It should be noted that currently, a PUCCH resource may have the following five PUCCH formats, as shown in Table 5.

In this embodiment of this application, in step 1105 and step 1106, for an implementation in which the terminal device and the network device determine, by using the first PUCCH resource and the default quantity Z of repeated transmissions, the N PUCCH resources used for the M times of repeated transmitting of the UCI, refer to Manner 1 to Manner 3 in Embodiment 2. Details are not described herein again.

Embodiment 6

When a quantity Z of repeated transmissions in Embodiment 1 is set by default, in other words, when a quantity of repeated transmissions corresponding to a resource (a PUCCH resource set) in the PUCCH resource set may be agreed on in advance in a protocol, a terminal device may complete repeated transmission of UCI based on a first PUCCH resource and a quantity T of interval symbols that are configured by a network device.

Figure 12A:
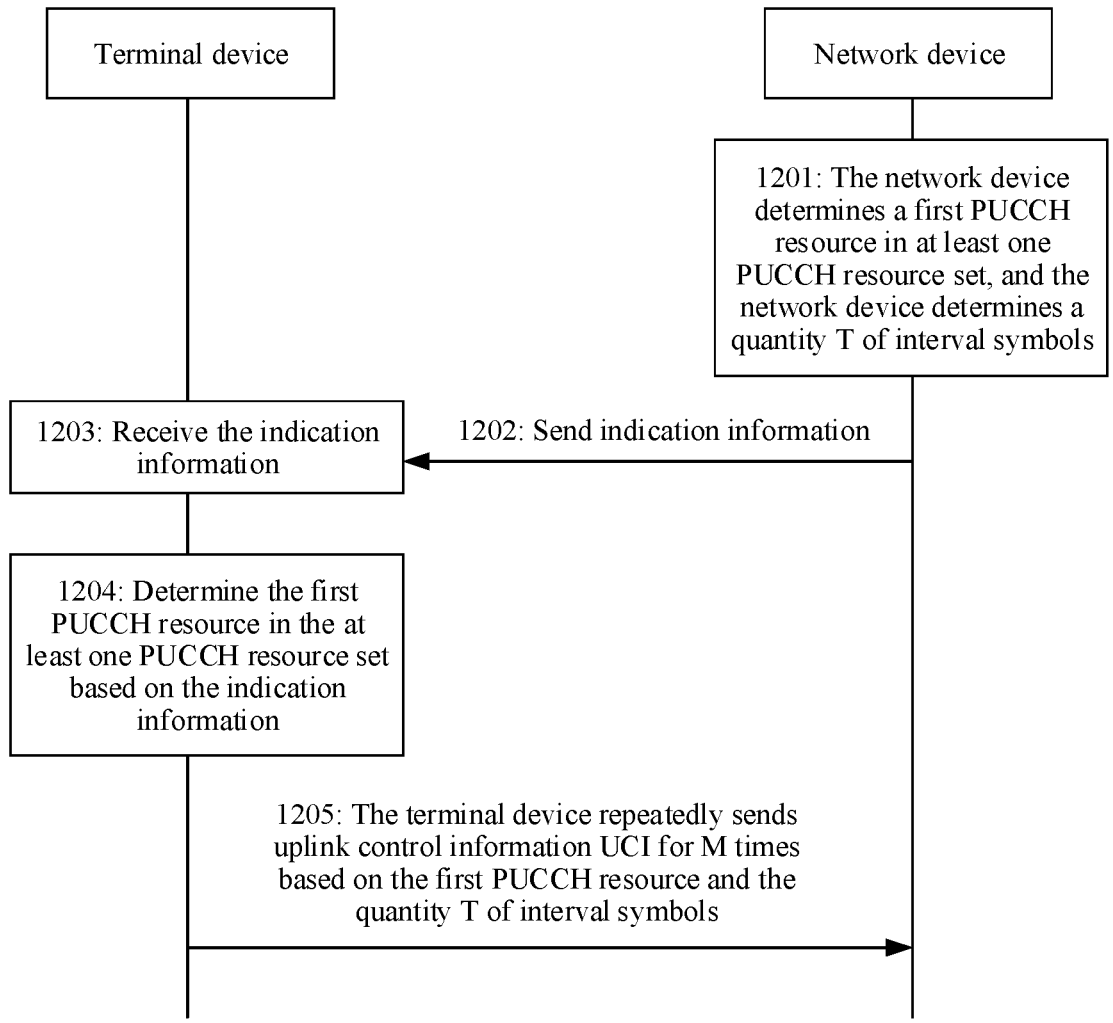
FIG. 12A is a schematic diagram of another uplink control information transmission method according to an embodiment of this application.

FIG. 12A is a schematic flowchart corresponding to an uplink control information transmission method according to Embodiment 6 of this application. As shown in FIG. 12A, the method includes the following steps.

Step 1201: A network device determines a first PUCCH resource and a quantity T of interval symbols in at least one PUCCH resource set.

Specifically, the PUCCH resource is used to carry UCI. For specific content of the UCI, refer to the foregoing embodiments.

Figure 12B:
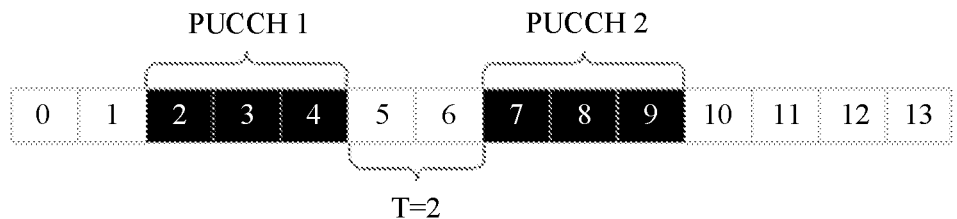
FIG. 12B and FIG. 12C are schematic diagrams of two quantities of interval symbols according to an embodiment of this application.
Figure 12C:
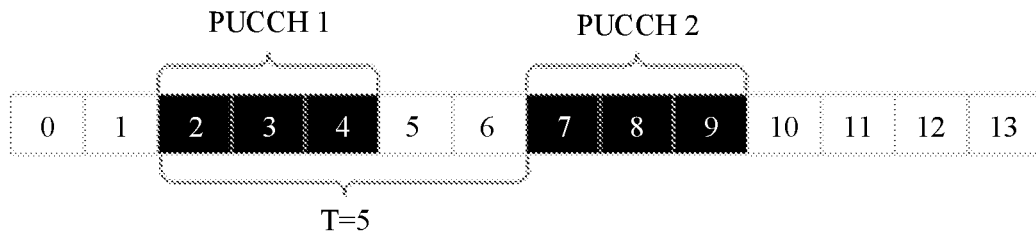

It should be noted that the quantity T of interval symbols indicates a relationship between Z PUCCH resources in time domain. In one case, the quantity T of interval symbols may be a quantity of interval symbols between the last symbol of a previous PUCCH resource of the first PUCCH resource and the first symbol of the first PUCCH resource, as shown in FIG. 12B. In another case, the quantity T of interval symbols may be a quantity of interval symbols between the first symbol of a previous PUCCH resource of the first PUCCH resource and the first symbol of the first PUCCH resource, as shown in FIG. 12C.

Step 1202: The network device sends indication information to a terminal device, where the indication information is used to indicate the first PUCCH resource and the quantity T of interval symbols.

The network device may indicate the first PUCCH resource and the quantity T of interval symbols by using a same piece of indication information, or may separately indicate the first PUCCH resource and the quantity T of interval symbols by using different pieces of indication information.

The indication information may be carried in signaling sent by the network device to the terminal device. For content of the signaling, refer to the foregoing embodiments. Details are not described herein again.

An indication manner of the first PUCCH resource may be an explicit indication, or may be an implicit indication. For details, refer to step 1202. Details are not described herein again.

Step 1203: The terminal device receives the indication information from the network device.

Specifically, the terminal device may receive the signaling from the network device, where the signaling includes the indication information. For example, the terminal device receives DCI, where the DCI includes the indication information.

Step 1204: The terminal device determines the first PUCCH resource in the at least one PUCCH resource set based on the indication information.

Step 1205: The terminal device repeatedly transmits the uplink control information UCI for M times based on the first PUCCH resource and the quantity T of interval symbols.

Specifically, the terminal device determines, by using the first PUCCH resource, the default quantity Z of repeated transmissions, and the quantity T of interval symbols, Z PUCCH resources used for the M times of repeated transmitting of the UCI. In addition, the terminal device determines M by using the N PUCCH resources, where the first PUCCH resource is one of the Z PUCCH resources. The terminal device repeatedly transmits the UCI for M times by using the Z PUCCH resources.

In another example, the terminal device may determine the Z PUCCH resources based on the first PUCCH resource, the quantity T of interval symbols, and the quantity Z of repeated transmissions, and repeatedly transmit the UCI for M times by using the Z PUCCH resources. Correspondingly, the network device obtains Z PUCCH resources in a same manner, and repeatedly receives the UCI for M times.

Specifically, the network device determines, by using the first PUCCH resource, the quantity T of interval symbols, and the quantity Z of repeated transmissions, the Z PUCCH resources used for the M times of repeated receiving of the UCI. In addition, the network device determines M by using the Z PUCCH resources, where the first PUCCH resource is one of the Z PUCCH resources. The network device repeatedly receives the UCI for M times by using the Z PUCCH resources, where one PUCCH resource carries one piece of UCI.

It should be emphasized that for a manner in which the terminal device and the network device determine M by using the Z PUCCH resources, refer to the foregoing embodiments. Details are not described herein again. For an implementation in which the terminal device and the network device determine, by using the first PUCCH resource and the default quantity Z of repeated transmissions, the Z PUCCH resources used for the M times of repeated transmitting of the UCI, refer to the foregoing embodiments. Details are not described herein again.

It should be emphasized that the quantity T of interval symbols may be set by default. When the quantity T of interval symbols is set by default, the quantity T of interval symbols is a default value. For example, the default quantity T of interval symbols may be 0 by default.

Embodiment 7

Figure 13:
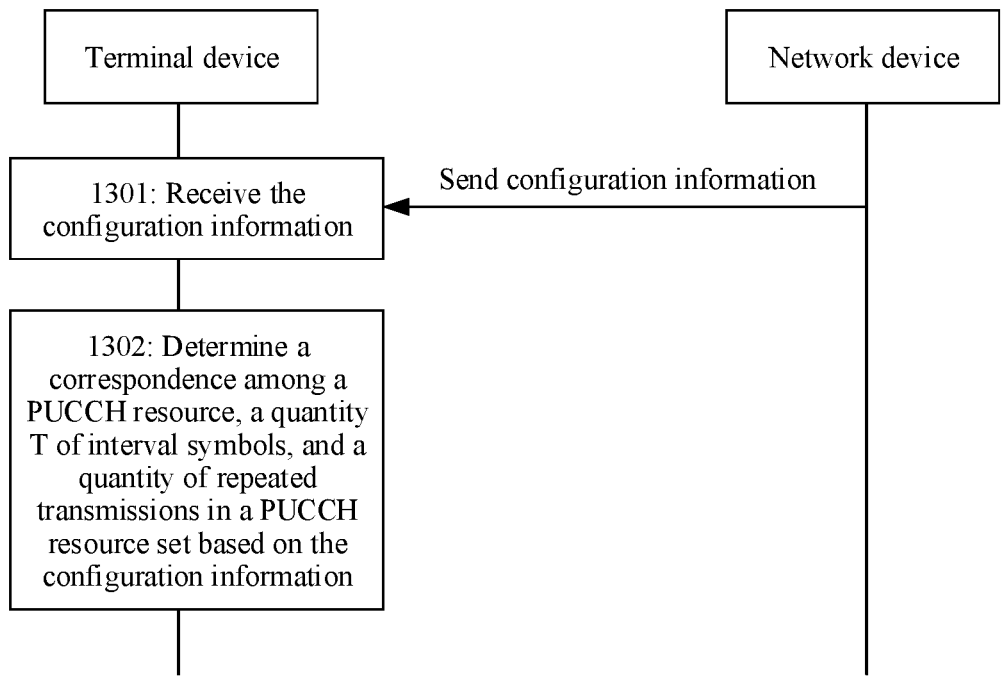
FIG. 13 is a schematic flowchart of another communication method according to an embodiment of this application.

FIG. 13 is a schematic flowchart of a communication method according to an embodiment of this application. The method specifically includes the following steps.

Step 1301: A terminal device receives configuration information from a network device, where the configuration information includes parameters indicating a quantity of repeated transmissions and a quantity of interval symbols.

In other words, the network device configures a first parameter for a PUCCH resource set or a PUCCH resource corresponding to the terminal device, and the first parameter is used to indicate the quantity of repeated transmissions and the quantity of interval symbols of the PUCCH resource. The quantity of repeated transmissions and the quantity of interval symbols that correspond to the PUCCH resource set or the PUCCH resource in the PUCCH resource set are independently configured by the network device. The PUCCH resource set in this specification actually refers to an information element of the PUCCH resource set.

For example, a one-to-one correspondence among the PUCCH resource, the quantity of repeated transmissions, and the quantity T of interval symbols in the configuration information is shown in Table 7.

TABLE 7

| Index value | Identifier of the PUCCH resource | Quantity Z of repetitions | Quantity T of interval symbols |
|---|---|---|---|
| 1 | PUCCH resource 1 | 3 | 3 |
| 2 | PUCCH resource 2 | 4 | 1 |
| 3 | PUCCH resource 3 | 5 | 2 |

Step 1302: The terminal device determines the correspondence among the PUCCH resource, the quantity T of interval symbols, and the quantity of repeated transmissions in the PUCCH resource set based on the configuration information.

In a first possible embodiment, if the parameters are a quantity Z of repeated transmissions and a quantity T of interval symbols that correspond to at least one PUCCH resource in at least one PUCCH resource set, the terminal device may determine the correspondence among the PUCCH resource, the quantity of repeated transmissions, and the quantity of interval symbols.

For example, for FIG. 4A, a correspondence, among the PUCCH resource, the quantity of repeated transmissions, and the quantity of interval symbols in the PUCCH resource set 1, that is determined by the terminal device may be shown in Table 8.

TABLE 8

| Index value | Identifier of the PUCCH resource | Quantity Z of repetitions | Quantity T of interval symbols |
|---|---|---|---|
| 1 | PUCCH resource 1 | 3 | 3 |
| 2 | PUCCH resource 2 | 4 | 1 |
| 3 | PUCCH resource 3 | 5 | 2 |

Embodiment 8

In Embodiment 8, a possible implementation of an uplink control information transmission method is described based on Embodiment 7.

Figure 14:
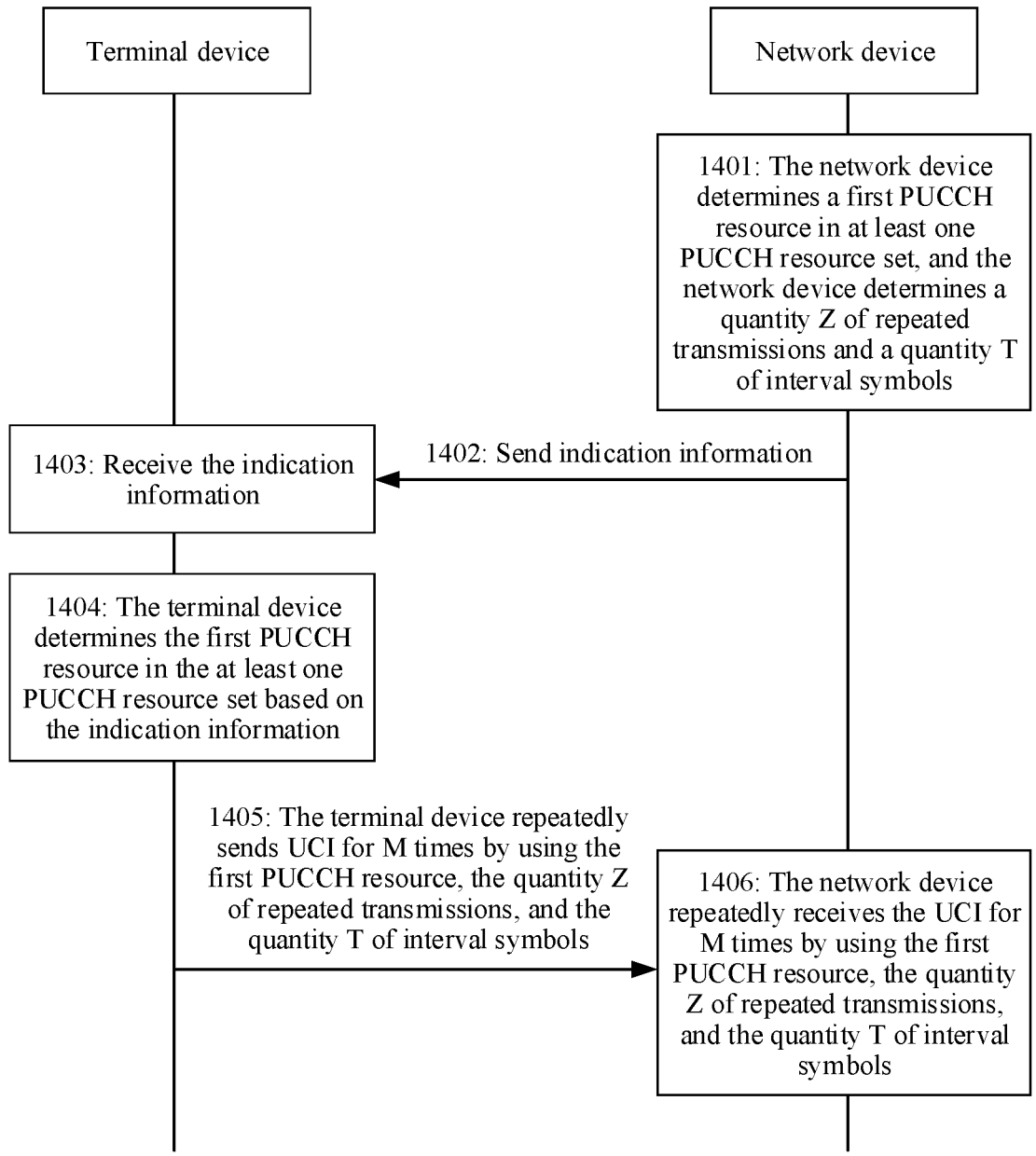
FIG. 14 is a schematic diagram of another uplink control information transmission method according to an embodiment of this application.

FIG. 14 is a schematic flowchart corresponding to an uplink control information transmission method according to Embodiment 8 of this application. As shown in FIG. 14, the method includes the following steps.

Step 1401: A network device determines a first PUCCH resource in at least one PUCCH resource set, and the network device determines a quantity Z of repeated transmissions and a quantity T of interval symbols.

The quantity Z of repeated transmissions is configured by the network device for the first PUCCH resource in the at least one PUCCH resource set.

Specifically, the PUCCH resource is used to carry UCI. For specific content of the UCI, refer to the foregoing embodiments.

Step 1402: The network device sends indication information to a terminal device, where the indication information is used to indicate the first PUCCH resource, the quantity Z of repeated transmissions, and the quantity T of interval symbols.

The indication information may be carried in signaling sent by the network device to the terminal device. For related descriptions of the signaling, refer to the foregoing embodiments.

In a possible embodiment, the network device may implicitly indicate the first PUCCH resource, the quantity Z of repeated transmissions, and the quantity T of interval symbols in the indication information. For example, the network device indicates the first PUCCH resource and the quantity Z of repetitions by using PUCCH resource indication information (PUCCH resource indicator, PRI) or a semi-persistent indication parameter in DCI. For example, with reference to Table 1, a bit of the PRI is "1", and "1" is used to indicate the PUCCH resource 1 and the quantity 3 of repeated transmissions in the row corresponding to the index value 1 in Table 1.

Step 1403: The terminal device receives the indication information from the network device.

Specifically, the terminal device may receive the signaling from the network device, where the signaling includes the indication information. For example, the terminal device receives DCI, where the DCI includes the indication information.

Step 1404: The terminal device determines the first PUCCH resource in the at least one PUCCH resource set based on the indication information.

For example, the at least one PUCCH resource set includes at least two PUCCH resource sets, and the terminal device determines a target PUCCH resource set in the at least two PUCCH resource sets based on a quantity of bits of the UCI, and determines the first PUCCH resource in the target PUCCH resource set based on the indication information.

For example, the terminal device determines the target PUCCH resource set in the at least two PUCCH resource sets based on the quantity Z of repeated transmissions; or determines the target PUCCH resource set in the at least two PUCCH resource sets based on the quantity Z of repeated transmissions and the quantity of bits of the UCI. Further, the terminal device determines the first PUCCH resource in the target PUCCH resource set based on the indication information.

A method for determining the first PUCCH resource by the network device is similar to that on a terminal side. Details are not described herein again.

In this embodiment of this application, there may be a plurality of implementations in which the terminal device determines the first PUCCH resource based on the indication information. For details, refer to the foregoing embodiments. Details are not described herein again.

Step 1405: The terminal device repeatedly transmits the UCI for M times by using the first PUCCH resource, the quantity Z of repeated transmissions, and the quantity T of interval symbols.

Step 1406: The network device repeatedly receives the UCI for M times by using the first PUCCH resource, the quantity Z of repeated transmissions, and the quantity T of interval symbols.

Specifically, the network device determines, by using the first PUCCH resource and the quantity Z of repeated transmissions, Z PUCCH resources used for the M times of repeated receiving of the UCI. In addition, the network device determines M by using the Z PUCCH resources, where the first PUCCH resource is one of the Z PUCCH resources. The network device repeatedly receives the UCI for M times by using the Z PUCCH resources, where one PUCCH resource carries one piece of UCI.

In step 1405 and step 1406, for a manner in which the terminal device and the network device determine M by using the N PUCCH resources, refer to the foregoing embodiments. Details are not described herein again.

In this embodiment of this application, in step 1405 and step 1406, for an implementation in which the terminal device and the network device determine, by using the first PUCCH resource and the default quantity Z of repeated transmissions, the Z PUCCH resources used for the M times of repeated transmitting of the UCI, refer to the foregoing embodiments. Details are not described herein again.

For Embodiment 1 to Embodiment 8, it should be noted that: (1) Embodiment 1 and Embodiment 8 may be separately implemented in different scenarios, or may be jointly implemented in a same scenario. Alternatively, different solutions described in different embodiments may also be implemented in combination (e.g., some or all solutions described in Embodiment 1 may be implemented in combination with Embodiment 2). This is not specifically limited.

(2) Step numbers in the flowcharts (e.g., FIG. 5 and FIG. 8) described in embodiments of this application are merely examples of execution procedures, and do not constitute a limitation on an execution sequence of the steps. In embodiments of this application, there is no strict execution sequence between steps that do not have a time sequence dependency relationship with each other.

The foregoing mainly describes the solutions provided in embodiments of this application from a perspective of interaction between a network device and a terminal device. It may be understood that, to implement the foregoing functions, the network device or the terminal device may include a corresponding hardware structure and/or a software module for performing each function. A person skilled in the art should be easily aware that, in combination with units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into function units may be performed on the terminal device and the network device based on the foregoing method examples. For example, division into each function unit may be based on each corresponding function, or two or more functions may be integrated into one unit. The integrated unit may be implemented in a form of hardware, or may be implemented in a form of a software function unit.

Figure 15:
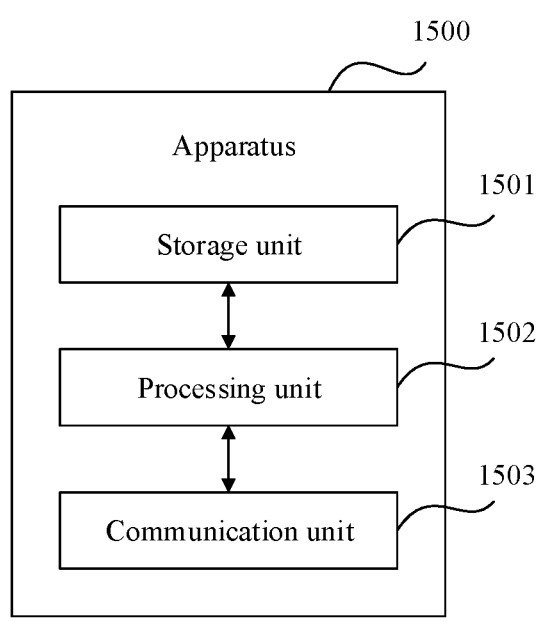
FIG. 15 is a schematic diagram of a terminal device according to an embodiment of this application.

When an integrated unit is used, FIG. 15 is a possible example block diagram of an apparatus according to an embodiment of this application. As shown in FIG. 15, the apparatus 1500 may include a processing unit 1502 and a communication unit 1503. The processing unit 1502 is configured to control and manage an action of the apparatus 1500. The communication unit 1503 is configured to support the apparatus 1500 in communicating with another device. Optionally, the communication unit 1503 is also referred to as a transceiver unit, and may include a receiving unit and/or a sending unit, respectively configured to perform a receiving operation and a sending operation. The apparatus 1500 may further include a storage unit 1501, configured to store program code and/or data of the apparatus 1500.

The apparatus 1500 may be the terminal device in any one of the foregoing embodiments, or may be a chip disposed in the terminal device. The processing unit 1502 may support the apparatus 1500 in performing actions of the terminal device in the foregoing method examples.

Specifically, in a possible embodiment, the communication unit 1503 is configured to receive indication information, where the indication information is used to indicate a first physical uplink control channel PUCCH resource and a quantity N of repeated transmissions, and N is a positive integer. The processing unit 1502 is configured to determine the first PUCCH resource and the quantity N of repeated transmissions in at least one PUCCH resource set based on the indication information. The processing unit 1502 is further configured to repeatedly transmit uplink control information UCI for M times by using the first PUCCH resource and the quantity N of repeated transmissions, where M is a positive integer.

In another possible embodiment, the communication unit 1503 is configured to receive configuration information from a network device, where the configuration information includes at least one physical uplink control channel PUCCH resource set, the PUCCH resource set includes at least one PUCCH resource subset, the at least one PUCCH resource subset includes A PUCCH resources, and A is greater than or equal to 2.

The communication unit 1503 is configured to receive indication information, where the indication information is used to determine a target PUCCH resource subset in the at least one PUCCH resource set.

The communication unit 1503 is configured to repeatedly transmit uplink control information UCI for M times by using N PUCCH resources in the target PUCCH resource subset, where M and N are positive integers.

In another possible embodiment, the communication unit 1503 is configured to: receive indication information, and determine a first PUCCH resource from at least one PUCCH resource set based on the indication information. The communication unit 1503 is further configured to repeatedly transmit uplink control information UCI for M times based on the first PUCCH resource, where M is a positive integer.

Content of the methods executed by the terminal device side in Embodiment 1 to Embodiment 8 may be referenced in the apparatus. Details are not described herein again.

The apparatus 1500 may be the network device in any one of the foregoing embodiments, or may be a chip disposed in the network device. The processing unit 1502 in the apparatus 1500 may support the apparatus 1500 in performing actions of the network device in the foregoing method examples.

Specifically, in a possible embodiment, the processing unit 1502 determines a first PUCCH resource and a quantity N of repeated transmissions in at least one physical uplink control channel PUCCH resource set, where N is a positive integer. The communication unit 1503 is configured to send indication information, where the indication information is used to indicate the first PUCCH resource and the quantity N of repeated transmissions. The communication unit 1503 is further configured to repeatedly receive uplink control information UCI for M times by using the first PUCCH resource and the quantity N of repeated transmissions, where M is a positive integer.

In another possible embodiment, the communication unit 1503 is configured to send configuration information, where the configuration information includes at least one physical uplink control channel PUCCH resource set, the PUCCH resource set includes at least one PUCCH resource subset, the at least one PUCCH resource subset includes A PUCCH resources, and A is greater than or equal to 2. The communication unit 1503 is further configured to send indication information, where the indication information is used to determine a target PUCCH resource subset in the at least one PUCCH resource set. The communication unit 1503 is further configured to repeatedly receive uplink control information UCI for M times by using N PUCCH resources in the target PUCCH resource subset, where M and N are positive integers.

In another possible embodiment, the communication unit 1503 is configured to send indication information, where the indication information is used to indicate the first PUCCH resource. The communication unit 1503 is further configured to repeatedly receive uplink control information UCI for M times based on the first PUCCH resource, where M is a positive integer.

Content of the methods executed by the network device side in Embodiment 1 to Embodiment 8 may be referenced in the apparatus. Details are not described herein again.

It should be understood that division of the foregoing apparatus into units is merely division into logical functions. During actual implementation, all or some of the units may be integrated into one physical entity, or may be physically separated. In addition, all the units in the apparatus may be implemented in a form in which a processing element invokes software, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in the processor element, or may be implemented in the form in which a processing element invokes software.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the unit in the apparatus is implemented by scheduling a program by a processing element, the processing element may be a processor, for example, a general-purpose central processing unit (CPU) or another processor that can invoke the program. For another example, the units may be integrated together and implemented in a form of a system-on-a-chip (SOC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 16:
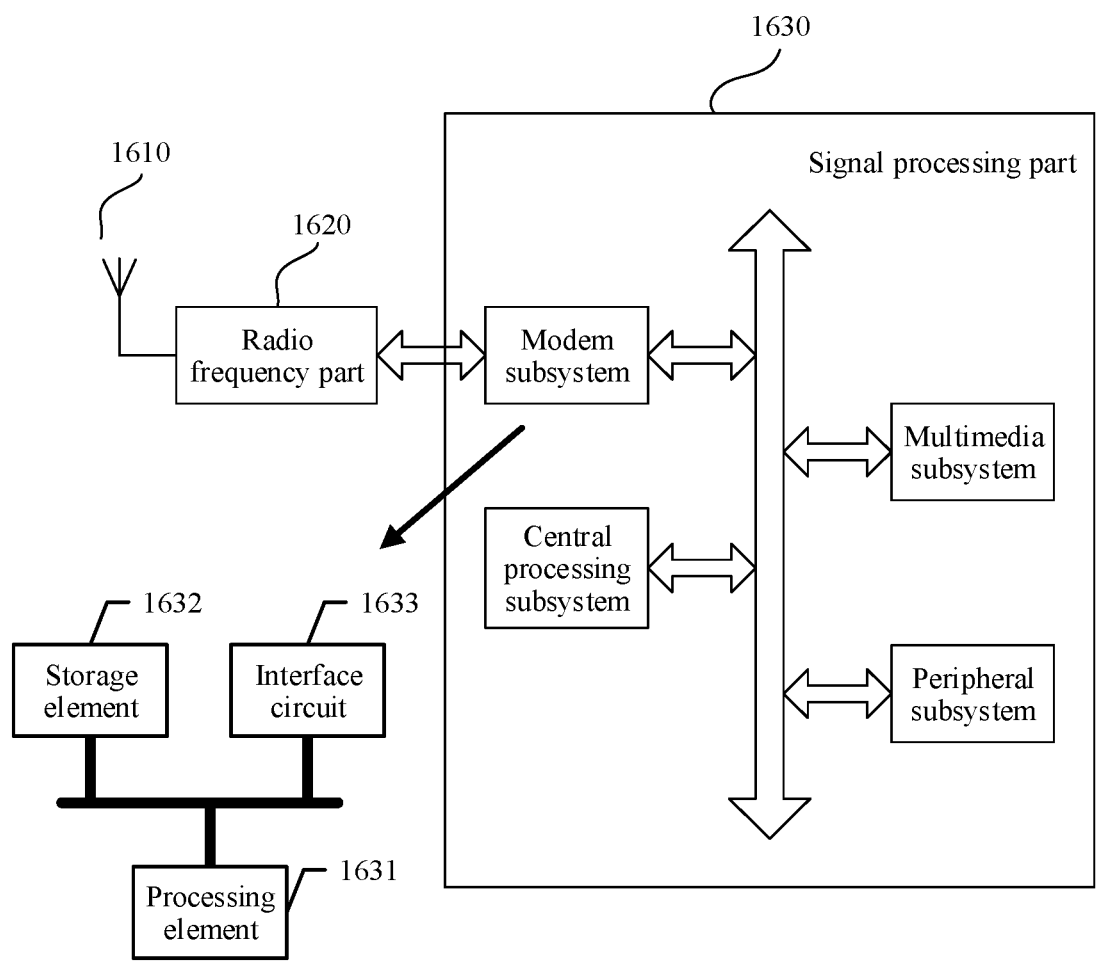
FIG. 16 is a schematic diagram of a structure of a network device according to an embodiment of this application.

FIG. 16 is a schematic diagram of a structure of a terminal device according to an embodiment of this application. The terminal device may be the terminal device in the foregoing embodiments, and may be configured to implement operations of the terminal device in the foregoing embodiments. As shown in FIG. 16, the terminal device includes an antenna 1610, a radio frequency part 1620, and a signal processing part 1630. The antenna 1610 is connected to the radio frequency part 1620. In a downlink direction, the radio frequency part 1620 receives, through the antenna 1610, information sent by a network device, and sends, to the signal processing part 1630 for processing, the information sent by the network device. In an uplink direction, the signal processing part 1630 processes information of the terminal device, and sends the information to the radio frequency part 1620. The radio frequency part 1620 processes the information of the terminal device, and then sends the processed information to the network device through the antenna 1610.

The signal processing part 1630 may include a modem subsystem, configured to process data at each communication protocol layer. The signal processing part 1630 may further include a central processing subsystem, configured to process an operating system and an application layer of the terminal device. In addition, the signal processing part 1630 may further include another subsystem, for example, a multimedia subsystem or a peripheral subsystem. The multimedia subsystem is configured to control a camera, a screen display, and the like of the terminal device. The peripheral subsystem is configured to connect to another device. The modem subsystem may be a chip that is separately disposed.

The modem subsystem may include one or more processing elements 1631, for example, include one main control CPU and another integrated circuit. In addition, the modem subsystem may further include a storage element 1632 and an interface circuit 1633. The storage element 1632 is configured to store data and a program. However, a program used to perform the methods performed by the terminal device in the foregoing methods may not be stored in the storage element 1632, but is stored in a memory outside the modem subsystem, and is loaded and used by the modem subsystem when to be used. The interface circuit 1633 is configured to communicate with another subsystem.

The modem subsystem may be implemented by a chip. The chip includes at least one processing element and an interface circuit. The processing element is configured to perform the steps of any method performed by the foregoing terminal device. The interface circuit is configured to communicate with another apparatus. In an implementation, units in the terminal device for implementing the steps in the foregoing methods may be implemented by scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, that is, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. These integrated circuits may be integrated to form a chip.

Units of the terminal device that implement the steps in the foregoing methods may be integrated together, and implemented in a form of an SOC. The SOC chip is configured to implement the foregoing methods. At least one processing element and a storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processing element in combination with instructions; or may certainly perform, by combining the first manner and the second manner, some or all steps performed by the terminal device.

The processing element herein is the same as that described above, and may be implemented through a processor. A function of the processing element may be the same as a function of the processing unit described in FIG. 16. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented through a memory. A function of the storage element may be the same as a function of the storage unit described in FIG. 15. The storage element may be implemented through a memory. A function of the storage element may be the same as a function of the storage unit described in FIG. 15. The storage element may be one memory, or may be a general term of a plurality of memories.

The terminal device shown in FIG. 16 can implement processes related to the terminal device in the method embodiment shown in FIG. 5. Operations and/or functions of the modules in the terminal device shown in FIG. 16 are respectively intended to implement the corresponding procedures in the foregoing method embodiments. For details, refer to the descriptions in the foregoing method embodiments. To avoid repetition, detailed descriptions are properly omitted herein.

Figure 17:
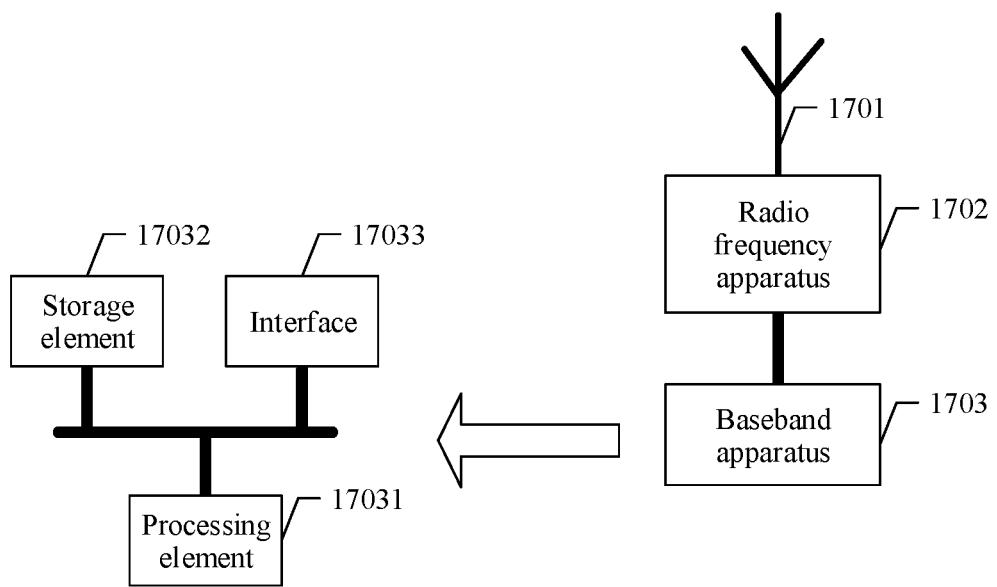
FIG. 17 is a schematic diagram of a structure of a communication apparatus according to an embodiment of this application.

FIG. 17 is a schematic diagram of a structure of a network device according to an embodiment of this application. The network device is configured to implement the operations of the network device in the foregoing embodiments. As shown in FIG. 17, the network device includes an antenna 1701, a radio frequency apparatus 1702, and a baseband apparatus 1703. The antenna 1701 is connected to the radio frequency apparatus 1702. In an uplink direction, the radio frequency apparatus 1702 receives, through the antenna 1701, information sent by a terminal device, and sends, to the baseband apparatus 1703, the information sent by the terminal device for processing. In a downlink direction, the baseband apparatus 1703 processes information of the terminal device, and sends the information to the radio frequency apparatus 1702. The radio frequency apparatus 1702 processes the information of the terminal device, and then sends the processed information to the terminal device through the antenna 1701.

The baseband apparatus 1703 may include one or more processing elements 17031, for example, include one main control CPU and another integrated circuit. In addition, the baseband apparatus 1703 may further include a storage element 17032 and an interface 17033. The storage element 17032 is configured to store a program and data. The interface 17033 is configured to exchange information with the radio frequency apparatus 1702, and the interface is, for example, a common public radio interface (CPRI). The foregoing apparatus used for the network device may be located in the baseband apparatus 1703. For example, the foregoing apparatus used for the network device may be a chip on the baseband apparatus 1703. The chip includes at least one processing element and an interface circuit. The processing element is configured to perform the steps of any one of the methods performed by the network device. The interface circuit is configured to communicate with another apparatus. In an implementation, units in the network device for implementing the steps in the foregoing methods may be implemented by scheduling a program by the processing element. For example, the apparatus used in the network device includes a processing element and a storage element. The processing element invokes a program stored in the storage element, to perform the method performed by the network device in the foregoing method embodiments. The storage element may be a storage element that is located on a same chip as the processing element, namely, an on-chip storage element, or may be a storage element that is located on a different chip from the processing element, namely, an off-chip storage element.

In another implementation, units of the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. These integrated circuits may be integrated to form a chip.

Units of the network device that implement the steps in the foregoing methods may be integrated together, and implemented in a form of a system-on-a-chip (SoC). For example, the baseband apparatus includes the SoC chip, configured to implement the foregoing methods. At least one processing element and a storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processing element in combination with instructions; or may certainly perform, by combining the first manner and the second manner, some or all steps performed by the network device.

The processing element herein is the same as that described above, and may be implemented through a processor. A function of the processing element may be the same as a function of the processing unit described in FIG. 15. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented through a memory. A function of the storage element may be the same as a function of the storage unit described in FIG. 17. The storage element may be implemented through a memory. A function of the storage element may be the same as a function of the storage unit described in FIG. 15. The storage element may be one memory, or may be a general term of a plurality of memories.

The network device shown in FIG. 17 can implement processes related to the network device in the method embodiments shown in FIG. 5 and FIG. 8. Operations and/or functions of the modules in the network device shown in FIG. 17 are respectively intended to implement the corresponding procedures in the foregoing method embodiments.

For details, refer to the descriptions in the foregoing method embodiments. To avoid repetition, detailed descriptions are properly omitted herein.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. An A method for repeatedly transmitting uplink control information (UCI) using a first physical uplink control channel (PUCCH) resource, the method comprising:

receiving indication information that is used to indicate the first PUCCH resource and a quantity N of repeated transmissions of the UCI, wherein N is a positive integer;

determining, based on a quantity of bits of the UCI to be repeatedly transmitted, a target PUCCH resource set of at least two PUCCH resource sets;

determining, based on the indication information, the first PUCCH resource in the target PUCCH resource set and the quantity N of repeated transmissions of the UCI; and repeatedly transmitting the quantity of bits of the UCI to be repeatedly transmitted for M times by using the first PUCCH resource and the quantity N of repeated transmissions, wherein M is a positive integer.

2. The method according to claim 1, wherein:

the quantity N of repeated transmissions is configured by a network device for the first PUCCH resource in the at least two PUCCH resource sets; or the quantity N of repeated transmissions is configured by the network device for a PUCCH resource set corresponding to the first PUCCH resource.

3. The method according to claim 1, wherein the indication information is carried in downlink control information (DCI).

4. The method according to claim 1, wherein time domain resources used for the M times of repeated transmitting of the UCI are resources in M sub-slots.

5. The method of claim 1, wherein a PUCCH resource used for each of the M times of repeated transmitting of the UCI occupies a same number of symbols in time domain.

6. A method for repeatedly transmitting uplink control information (UCI) using a first physical uplink control channel (PUCCH) resource, the method comprising:

determining the first PUCCH resource in a target PUCCH resource set and a quantity N of repeated transmissions of the UCI, wherein N is a positive integer;

sending indication information that is used to indicate the first PUCCH resource and the quantity N of repeated transmissions of the UCI; and repeatedly receiving the quantity of bits of the UCI for M times by using the first PUCCH resource and the quantity N of repeated transmissions, wherein M is a positive integer, wherein the target PUCCH resource set is determined of at least two PUCCH resource sets based on a quantity of bits of the UCI to be repeatedly transmitted using the first PUCCH resource.

7. The method according to claim 6, wherein, before the determining the first PUCCH resource in a target PUCCH resource set and a quantity N of repeated transmissions of the UCI, the method further comprises sending configuration information, and wherein the configuration information comprises:

a quantity of repeated transmissions corresponding to at least one PUCCH resource in the at least two PUCCH resource sets;

a quantity of repeated transmissions corresponding to the at least two PUCCH resource sets; or a maximum allowed quantity of repeated transmissions corresponding to the at least two PUCCH resource sets and a quantity of repeated transmissions corresponding to at least one PUCCH resource in the at least two PUCCH resource sets.

8. The method according to claim 6, wherein the indication information is carried in downlink control information (DCI).

9. The method according to claim 6, wherein a PUCCH resource used for each of the M times of repeated transmitting of the UCI occupies a same number of symbols in time domain.

10. The method according to claim 6, wherein time domain resources used for the M times of repeated transmitting of the UCI are resources in M sub-slots.

11. A communication apparatus, comprising:

a processor; and a non-transitory computer readable medium including computer-executable instructions that, when executed by the processor, facilitate the communication apparatus carrying out a method for repeatedly transmitting uplink control information (UCI) using a first physical uplink control channel (PUCCH) resource, the method comprising:

receiving indication information that is used to indicate the first PUCCH resource and a quantity N of repeated transmissions of the UCI, wherein N is a positive integer;

determining, based on a quantity of bits of the UCI to be repeatedly transmitted, a target PUCCH resource set of at least two PUCCH resource sets;

determining, based on the indication information, the first PUCCH resource in the target PUCCH resource set and the quantity N of repeated transmissions of the UCI; and repeatedly transmitting the quantity of bits of the UCI to be repeatedly transmitted for M times by using the first PUCCH resource and the quantity N of repeated transmissions, wherein M is a positive integer.

12. The communication apparatus according to claim 11, wherein:

the quantity N of repeated transmissions is configured by the network device for the first PUCCH resource in the at least two PUCCH resource sets; or the quantity N of repeated transmissions is configured by the network device for a PUCCH resource set corresponding to the first PUCCH resource.

13. The communication apparatus according to claim 11, wherein the indication information is carried in downlink control information (DCI).

14. The communication apparatus according to claim 11, wherein time domain resources used for the M times of repeated transmitting of the UCI are resources in M sub-slots.

15. The communication apparatus of claim 11, wherein a PUCCH resource used for each of the M times of repeated transmitting of the UCI occupies a same number of symbols in time domain.

16. A communication apparatus, comprising:

a processor; and a non-transitory computer readable medium including computer-executable instructions that, when executed by the processor, facilitate the communication apparatus carrying out a method for repeatedly transmitting uplink control information (UCI) using a first physical uplink control channel (PUCCH), the method comprising:

determining the first PUCCH resource in a target PUCCH resource set and a quantity N of repeated transmissions of the UCI, wherein N is a positive integer;

sending indication information that is used to indicate the first PUCCH resource and the quantity N of repeated transmissions of the UCI; and repeatedly receiving the quantity of bits of the UCI for M times by using the first PUCCH resource and the quantity N of repeated transmissions, wherein M is a positive integer, wherein the target PUCCH resource set is determined of at least two PUCCH resource sets based on a quantity of bits of the UCI to be repeatedly transmitted using the first PUCCH resource.

17. The apparatus according to claim 16, wherein, before the determining the first PUCCH resource in a target PUCCH resource set and a quantity N of repeated transmissions of the UCI, the method further comprises sending configuration information, and wherein the configuration information comprises:
- a quantity of repeated transmissions corresponding to at least one PUCCH resource in the at least two PUCCH resource sets;
- a quantity of repeated transmissions corresponding to the at least two PUCCH resource sets; or
- a maximum allowed quantity of repeated transmissions corresponding to the at least two PUCCH resource sets and a quantity of repeated transmissions corresponding to at least one PUCCH resource in the at least two PUCCH resource sets.

18. The apparatus according to claim 16, wherein the indication information is carried in downlink control information (DCI).

19. The apparatus according to claim 16, wherein a PUCCH resource used for each of the M times of repeated transmitting of the UCI occupies a same number of symbols in time domain.

20. The apparatus according to claim 16, wherein time domain resources used for the M times of repeated transmitting of the UCI are resources in M sub-slots.

* * * * *

UNITED STATES PATENT AND TRADEMARK OFFICE
CERTIFICATE OF CORRECTION

PATENT NO. : 12,335,955 B2
APPLICATION NO. : 17/866192
DATED : June 17, 2025
INVENTOR(S) : Li et al.

Page 1 of 1

It is certified that error appears in the above-identified patent and that said Letters Patent is hereby corrected as shown below:

In the Claims

Claim 1: Column 54, Line 61: "An A method for repeatedly transmitting uplink control" should read as -- A method for repeatedly transmitting uplink control --.

Signed and Sealed this
Eleventh Day of November, 2025

John A. Squires
*Director of the United States Patent and Trademark Office*